US012477638B2

(12) United States Patent
Stephan et al.

(10) Patent No.: US 12,477,638 B2
(45) Date of Patent: Nov. 18, 2025

(54) TWO-STAGE MULTIPLE-COLOR LIGHTING SPECTRA FOR OPTIMIZED JUVENILE POULTRY PRODUCTION

(71) Applicant: SIGNIFY HOLDING B.V., Eindhoven (NL)

(72) Inventors: Aaron Benjamin Stephan, Chanhassen, MN (US); Curtis Allen Leyk, Albany, MN (US)

(73) Assignee: SIGNIFY HOLDING B.V., Eindhoven (NL)

( * ) Notice: Subject to any disclaimer, the term of this patent is extended or adjusted under 35 U.S.C. 154(b) by 59 days.

(21) Appl. No.: 18/281,165

(22) PCT Filed: Mar. 7, 2022

(86) PCT No.: PCT/EP2022/055665
§ 371 (c)(1),
(2) Date: Sep. 8, 2023

(87) PCT Pub. No.: WO2022/189321
PCT Pub. Date: Sep. 15, 2022

(65) Prior Publication Data
US 2024/0163999 A1 May 16, 2024

Related U.S. Application Data

(60) Provisional application No. 63/160,101, filed on Mar. 12, 2021.

(30) Foreign Application Priority Data

Mar. 18, 2021 (EP) ..................... 21163323

(51) Int. Cl.
*H05B 47/155* (2020.01)
*A01K 31/18* (2006.01)
*H05B 45/20* (2020.01)

(52) U.S. Cl.
CPC ........... *H05B 47/155* (2020.01); *A01K 31/18* (2013.01); *H05B 45/20* (2020.01)

(58) Field of Classification Search
CPC ...... H05B 47/155; H05B 45/20; A01K 31/18; A01K 31/20; A01K 39/00
(Continued)

(56) References Cited

U.S. PATENT DOCUMENTS

2012/0002408 A1* 1/2012 Lichten .................. A01K 29/00
  362/218
2015/0156992 A1* 6/2015 Kasahara ............... A01K 31/00
  426/2
(Continued)

FOREIGN PATENT DOCUMENTS

CN   203162597 U   8/2013
WO   2014122915 A1 8/2014
(Continued)

OTHER PUBLICATIONS

Pan, Jinming, et al., "Artificial Polychromatic Light Affects Growth and Physiology in Chicks," College of Biosystems Engineering and Food Science, Hangzhou, China, Research Article, Plos One 9(12): E113595. DOI: 10.1371/JOURNAL.PONE.0113595 (21 Pages).
(Continued)

*Primary Examiner* — Ryan Jager

(57) ABSTRACT

The invention provides a light generating system (1000), wherein the light generating system (1000) is configured to generate system light (1001) having a controllable spectral power distribution and intensity, wherein in an operational mode the light generating system (1000) is configured to generate during a first time period $P_1$, a first spectral power distribution $E_1$, and during a second time period $P_2$, later in time than the first period $P_1$, a second spectral power distribution $E_2$, wherein: (A) the controllable spectral power distribution comprises (a) a first spectral range $\Lambda_1$ having one or more wavelengths in the blue, and having a primary first spectral power $SP(P_1, \Lambda_1)$ during the first time period $P_1$ and a secondary first spectral power $SP(P_2, \Lambda_1)$ during the second time period $P_2$, (b) a second spectral range $\Lambda_2$ having one or more wavelengths in the green, and having a primary second spectral power $SP(P_1, \Lambda_2)$ during the first time period $P_1$ and a secondary second spectral power $SP(P_2, \Lambda_2)$ during the second time period $P_2$, and (c) an amber-red spectral range $\Lambda_{34}$ having one or more wavelengths in the amber-red, and having a primary amber-red spectral power $SP(P_1, \Lambda_{34})$ during the first time period $P_1$ and a secondary amber-red spectral power $SP(P_2, \Lambda_{34})$ during the second time period $P_2$; (B) the first spectral power distribution $E_1$ comprises the primary first spectral power $SP(P_1, \Lambda_1)$, the primary second spectral power $SP(P_1, \Lambda_2)$, and the primary amber-red
(Continued)

spectral power $SP(P_1, \Lambda_{34})$; the second spectral power distribution $E_2$ comprises the secondary first spectral power $SP(P_2, \Lambda_1)$, the secondary second spectral power $SP(P_2, \Lambda_2)$, and the secondary amber-red spectral power $SP(P_2, \Lambda_{34})$; (C) the first period $P_1$ is selected from of at least part of a day; the second period $P_2$ is selected from the range of at least part of a day; (D) $SP(P_1, \Lambda_1)>0$ Watt, $SP(P_1, \Lambda_2)>0$ Watt, and $SP(P_1, \Lambda_{34})>0$ Watt; $SP(P_2, \Lambda_1)>0$ Watt, and $SP(P_2, \Lambda_2)>0$ Watt; $SP(P_2, \Lambda_2)/SP(P_2, \Lambda_1)<SP(P_1, \Lambda_2)/SP(P_1, \Lambda_1)$; $SP(P_2, \Lambda_{34})/SP(P_2, \Lambda_1)<SP(P_1, \Lambda_{34})/SP(P_1, \Lambda_1)$; and $SP(P_2, \Lambda_{34})/SP(P_2, \Lambda_2)<SP(P_1, \Lambda_{34})/SP(P_1, \Lambda_2)$.

15 Claims, 5 Drawing Sheets

(58) Field of Classification Search
USPC .......................................................... 315/294
See application file for complete search history.

(56) References Cited

U.S. PATENT DOCUMENTS

| | | | | |
|---|---|---|---|---|
| 2016/0270375 | A1* | 9/2016 | Pan | A01K 31/18 |
| 2017/0000163 | A1* | 1/2017 | Grajcar | A01K 39/00 |
| 2017/0211779 | A1 | 7/2017 | Pickett et al. | |
| 2019/0037665 | A1* | 1/2019 | Cao | H05B 47/19 |
| 2021/0329757 | A1* | 10/2021 | Peeters | H05B 45/20 |

FOREIGN PATENT DOCUMENTS

| | | |
|---|---|---|
| WO | 2019213291 A1 | 11/2019 |
| WO | 2020043649 A1 | 3/2020 |

OTHER PUBLICATIONS

Cao, J., et al., "Green and Blue Monochromatic Lights Promote Growth and Development of Broilers Via Stimulating Testosterone Secretion and Myofiber Growth," Laboratory of Anatomy of Domestic Animal, College of Veterinary Medicine, Beijing, China, Poultry Science Association, Inc., J. Appl. Poult. Res. 17, DOI: 10.3382/JAPR.2007-00043, 2008 (8 Pages).

Rozenboim, Israel, et al., "The Effect of Green and Blue Monochromatic Light Combination On Broiler Growth and Development," Article in Poultry Science, https://www.researchgate.net/publication/8563931, Jun. 2004 (5 Pages).

* cited by examiner

TWO-STAGE MULTIPLE-COLOR LIGHTING SPECTRA FOR OPTIMIZED JUVENILE POULTRY PRODUCTION

CROSS-REFERENCE TO PRIOR APPLICATIONS

This application is the U.S. National Phase application under 35 U.S.C. § 371 of International Application No. PCT/EP2022/055665, filed on Mar. 7, 2022, which claims the benefit of European Patent Application No. 21163323.5, filed on Mar. 18, 2021, and U.S. Provisional Application Ser. No. 63/160,101, filed on Mar. 12, 2021. These applications are hereby incorporated by reference herein.

FIELD OF THE INVENTION

The invention relates to a light generating system. The invention further relates to an animal farm system comprising such light generating system. The invention further relates to a method for providing system light to a residence. Yet further, the invention also relates to specific light generating device.

BACKGROUND OF THE INVENTION

The use of light in animal breeding or rearing is known in the art. For instance, US2017/0000163, describes a method of increasing feed consumption of avian, comprising: providing an aviary system located within an enclosure, wherein the aviary system includes an internal volume for housing avian; illuminating feed for the avian with a light from an artificial light source having a spectrum that is less than 400 nanometers (nm) to cause the avian to eat the feed. The spectrum is between 380 nm and 400 nm. The artificial light source has a plurality of light emitting diodes that provide the spectrum.

WO2020/043649A discloses a light generating device comprising a first source of first light and a second source of second light, wherein the second light comprises cyan-like light having a wavelength selected from the range of 470-520 nm, and wherein the first light is white light and the device outputs white light enriched with the cyan-like light.

US2012/002408A discloses a lighting fixture for a poultry housing including an elongated body and a transparent cover that is coupled to the body and is configured to create an internal space with the body. A first LED is disposed in the internal space and emits light having a first color. A second LED is disposed in the internal space and emits light having a second color that is distinct from the first color. A controller independently controls an output of the first and second LEDs.

US2019/037665A1 discloses a farming light control system having rows of lighting devices provided in a sealed farming environment and an interface module. The lighting devices in the rows of lighting devices connect to a first end of the interface module via a communication line. The lighting devices include a green LED, a blue LED, and a white LED. A second end of the interface module connects to a control module that connects to the rows of lighting devices via the interface module. The light emission states of the lighting devices are automatically controlled by the control module.

SUMMARY OF THE INVENTION

Rearing poultry for commercial production requires strict control of environmental factors including temperature, humidity, ventilation, feed and water, and light. Modern broiler chickens grow from a 40-g newly hatched chick to up to 5 kg bird within 8 weeks of growth. Given this large transformation, environmental management requirements change significantly over a chicken's lifespan. During the first 7-10 days of life, termed "brood", the chicks require special care to ensure that their body temperatures stay high enough and that they learn to find food and water. In the later course of their life (days 20-harvest or through sexual maturity, termed "grow-out"), the chickens require an environment that supports large quantities of feed and water consumption and an aggression-free space to rest. It appears that different wavelengths of light have different biological effects on poultry. Further, it appears that over the rearing period different types of light may be desirable.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

For instance, it appears that red light promotes activity such as feeding and drinking and also aggression. Therefore, red light may be advantageous during brood, but may be less desirable during grow-out. Blue and green light appear to promote muscle growth and weight gain. Blue light tends to relax the birds and reduce locomotion.

Would known lighting systems be applied in poultry houses, "cool" white LEDs that employ a blue LED with a red+green phosphor may provide the light. Such lighting systems may have a fixed-wavelength spectrum that does not change over the course of rearing.

It surprisingly appears that the relative intensities may beneficially be controlled for optimal rearing. It was surprisingly observed that green spectra have biological effects that are intermediate between blue and red light. Specifically, it was found that too much green light during grow-out may have a similar effect as red and birds may exhibit a relatively too much locomotion and/or fighting, resulting in poorer feed conversion ratios and poorer growth rates. The present invention proposes to use independent control of blue, green, and red. Further, it appears that in addition to red or alternative to red, amber light may be applied. Hence, herein the term "amber-red" may herein refer to the wavelength range of 580-750 nm. When light has intensity (or spectral power) in the amber-red wavelength range, such light (more especially its spectral power distribution) may have (intensity at) one or more wavelengths in the range of 580-750 nm.

Hence, in a first aspect the invention provides a light generating system (especially in embodiments for lighting in a poultry residence). Especially, the light generating system may be configured to generate system light having a controllable spectral power distribution and intensity. In embodiments, in an operational mode the light generating system may be configured to generate during a first time period $P_1$, a first spectral power distribution $E_1$, and during a second time period $P_2$, especially later in time than the first period $P_1$, a second spectral power distribution $E_2$. In embodiments, the controllable spectral power distribution comprises (a) a first spectral range $\Lambda_1$ having one or more wavelengths in the blue. Especially, the first spectral range has a primary first spectral power $SP(P_1, \Lambda_1)$ during the first time period $P_1$ and a secondary first spectral power $SP(P_2, \Lambda_1)$ during the second time period $P_2$. Further, in embodiments the controllable spectral power distribution comprises (b) a second spectral range $\Lambda_2$ having one or more wavelengths in the green. Especially, the second spectral range $\Lambda_2$ has a primary second spectral power $SP(P_1, \Lambda_2)$ during the first time period $P_1$ and a secondary second spectral power $SP(P_2, \Lambda_2)$ during the second time period $P_2$. Yet further, in embodiments, the controllable spectral power distribution comprises (c) an amber-red spectral range $\Lambda_{34}$ having one or more wavelengths in the amber-red. Especially, the amber-red spectral range $\Lambda_{34}$ has a primary amber-red spectral power $SP(P_1, \Lambda_{34})$ during the first time period $P_1$ and a secondary amber-red spectral power $SP(P_2, \Lambda_{34})$ during the second time period $P_2$. Further, especially the first spectral power distribution $E_1$ comprises the primary first spectral power $SP(P_1, \Lambda_1)$, the primary second spectral power $SP(P_1, \Lambda_2)$, and the primary amber-red spectral power $SP(P_1, \Lambda_{34})$. Yet further, in embodiments the second spectral power distribution $E_2$ comprises the secondary first spectral power $SP(P_2, \Lambda_1)$, the secondary second spectral power $SP(P_2, \Lambda_2)$, and the secondary amber-red spectral power $SP(P_2, \Lambda_{34})$. Especially, in embodiments the first period $P_1$ may be selected from of at least part of a day; the second period $P_2$ is selected from the range of at least part of a day. Further, in specific, embodiments $SP(P_1, \Lambda_1) > 0$ Watt, $SP(P_1, \Lambda_2) > 0$ Watt, and $SP(P_1, \Lambda_{34}) > 0$ Watt. Yet further, in specific embodiments $SP(P_2, \Lambda_1) > 0$ Watt, and $SP(P_2, \Lambda_2) > 0$ Watt. Yet further, in embodiments $SP(P_2, \Lambda_2)/SP(P_2, \Lambda_1) < SP(P_1, \Lambda_2)/SP(P_1, \Lambda_1)$. In embodiments also $SP(P_2, \Lambda_{34})/SP(P_2, \Lambda_1) < SP(P_1, \Lambda_{34})/SP(P_1, \Lambda)$ may apply. Yet, in embodiments $SP(P_2, \Lambda_{34})/SP(P_2, \Lambda_2) < SP(P_1, \Lambda_{34})/SP(P_1, \Lambda_2)$. Hence, in specific embodiments the invention provides a light generating system (for lighting in a poultry residence), wherein the light generating system is configured to generate system light having a controllable spectral power distribution and intensity, wherein in an operational mode the light generating system is configured to generate during a first time period $P_1$, a first spectral power distribution $E_1$, and during a second time period $P_2$, later in time than the first period $P_1$, a second spectral power distribution $E_2$, wherein: (A) the controllable spectral power distribution comprises (a) a first spectral range $\Lambda_1$ having one or more wavelengths in the blue, and having a primary first spectral power $SP(P_1, \Lambda_1)$ during the first time period $P_1$ and a secondary first spectral power $SP(P_2, \Lambda_1)$ during the second time period $P_2$, (b) a second spectral range $\Lambda_2$ having one or more wavelengths in the green, and having a primary second spectral power $SP(P_1, \Lambda_2)$ during the first time period $P_1$ and a secondary second spectral power $SP(P_2, \Lambda_2)$ during the second time period $P_2$, and (c) an amber-red spectral range $\Lambda_{34}$ having one or more wavelengths in the amber-red, and having a primary amber-red spectral power $SP(P_1, \Lambda_{34})$ during the first time period $P_1$ and a secondary amber-red spectral power $SP(P_2, \Lambda_{34})$ during the second time period $P_2$; (B) the first spectral power distribution $E_1$ comprises the primary first spectral power $SP(P_1, \Lambda_1)$, the primary second spectral power $SP(P_1, \Lambda_2)$, and the primary amber-red spectral power $SP(P_1, \Lambda_{34})$; the second spectral power distribution $E_2$ comprises the secondary first spectral power $SP(P_2, \Lambda_1)$, the secondary second spectral power $SP(P_2, \Lambda_2)$, and the secondary amber-red spectral power $SP(P_2, \Lambda_{34})$; (C) the first period $P_1$ is selected from of at least part of a day; the second period $P_2$ is selected from the range of at least part of a day; and (D) $SP(P_1, \Lambda_1) > 0$ Watt, $SP(P_1, \Lambda_2) > 0$ Watt, and $SP(P_1, \Lambda_{34}) > 0$ Watt; $SP(P_2, \Lambda_1) > 0$ Watt, and $SP(P_2, \Lambda_2) > 0$ Watt; $SP(P_2, \Lambda_2)/SP(P_2, \Lambda_1) < SP(P_1, \Lambda_2)/SP(P_1, \Lambda_1)$; $SP(P_2, \Lambda_{34})/SP(P_2, \Lambda_1) < SP(P_1, \Lambda_{34})/SP(P_1, \Lambda_1)$; and $SP(P_2, \Lambda_{34})/SP(P_2, \Lambda_2) < SP(P_1, \Lambda_{34})/SP(P_1, \Lambda_2)$.

The present system may provide amongst others optimal ratios between these wavelengths to achieve the desired biological responses across a production cycle. The average chicken weight may increase with the present invention and the food conversion rate may decrease. The present invention may also better allow light control in dependence of the type of poultry and/or of the rearing target and/or timing. Further, it appears that with the present system (and method), the poultry, such as chickens, may have less stress and/or fear. Preliminary results also seem to indicate that there may even be a positive influence on the immune function of the poultry as lower stress may be beneficial for the immune system.

The light generating system may be configured to provide system light to an animal residence. The animal residence, especially a poultry residence, may host poultry (see also below).

As indicated above, the invention provides a light generating system, especially for lighting in a poultry residence. However, other applications are not excluded.

The light generating system may be configured to generate system light having a controllable spectral power distribution and intensity. To this end, the light generating system may comprise a plurality of light sources, such as solid state light sources (see further also below).

The light generating system may especially be able to provide different types of light. Basically, the light generating system may especially be able to provide first light comprising blue, green and one or more of amber and red, and second light wherein the green and one or more of amber and red component are reduced relative to the blue component when comparing with the relative intensities of the first light. Especially, the one or more of amber and red component may even be further reduced than the green component.

Especially, the first light may be provided during at least parts of days during an earlier part of the rearing period, and the second light may be provided during at least parts of the day in a later part of the rearing period. Further, especially the light generating system may be able to gradually change from the first type of light to the second type of light.

Hence, in embodiments in an operational mode the light generating system may be configured to generate during a first time period $P_1$, a first spectral power distribution $E_1$, and during a second time period $P_2$, later in time than the first period $P_1$, a second spectral power distribution $E_2$.

The first period $P_1$ may be selected from of at least part of a day. For instance, the first period may be at least 8 hours, like at least 10 hours, like at least 12 hours, such as at least 14 hours. However, the first period may also be longer, such as at least about 16 hours, such as at least about 18 hours, or even longer such as at least about 20 hours, such as even up to 24 hours. Hence, in specific embodiments the first period $P_1$ may be selected from the range of 8-24. hours. The first period may be executed during a plurality of days during a first part of the rearing period, such as up to about 10 days (see also below). The second period $P_2$ may (also) be selected from the range of at least part of a day. For instance, the second period may be at least 8 hours, like at least 10 hours, like at least 12 hours, such as at least 14 hours. However, the second period may also be longer, such as at least about 16 hours, such as at least about 18 hours, or even longer such as at least about 20 hours, such as even up to 24 hours. In specific embodiments, the second period may be up to about 22 hours. Hence, in specific embodiments the second period $P_2$ may be selected from the range of 8-22 hours. The second period may be executed during a plurality of days during a second part of the rearing period, such as after about 10 days (see also below). The term "day" refers to a period of 24 hours.

Therefore, in specific embodiments the first period $P_1$ may be selected from the range of 8-24 hours and the second period $P_2$ may be selected from the range of 8-22 hours.

As can be derived from the above, the controllable spectral power distribution comprises (a) a first spectral range $\Lambda_1$ having one or more wavelengths in the blue, and having a primary first spectral power $SP(P_1, \Lambda_1)$ during the first time period $P_1$ and a secondary first spectral power $SP(P_2, \Lambda_1)$ during the second time period $P_2$, (b) a second spectral range $\Lambda_2$ having one or more wavelengths in the green, and having a primary second spectral power $SP(P_1, \Lambda_2)$ during the first time period $P_1$ and a secondary second spectral power $SP(P_2, \Lambda_2)$ during the second time period $P_2$, and (c) an amber-red spectral range $\Lambda_{34}$ having one or more wavelengths in the amber-red, and having a primary amber-red spectral power $SP(P_1, \Lambda_{34})$ during the first time period $P_1$ and a secondary amber-red spectral power $SP(P_2, \Lambda_{34})$ during the second time period $P_2$.

Especially, in embodiments the first spectral range $\Lambda_1$, the second spectral range $\Lambda_2$, and the amber-red spectral range $\Lambda_{34}$ may be essentially non-overlapping.

Herein, essentially non-overlapping may e.g. be that equal to or less than 5% of the wavelength range of a smaller wavelength range (in terms of nanometers) overlaps with a larger wavelength range (in terms of nanometers). For instance, in the case of the wavelength ranges of 580-620 nm and 620-750 nm, the former wavelength range defines a range of 40 nm and the latter defines a range of 130 nm. The overlap may be 1 nm (as they may be considered to share the 620 nm value), which is 2.5% of the 40 nm wavelength range. For instance, in the case of the wavelength ranges of 510-580 nm and 580-620 nm, the former wavelength range defines a range of 70 nm and the latter defines a range of 40 nm. The overlap may be 1 nm (as they may be considered to share the 580 nm value), which is 2.5% of the 40 nm wavelength range.

As indicated above and further also elucidated below, the phrase "an amber-red spectral range $\Lambda_{34}$ having one or more wavelengths in the amber-red", and similar phrases, may refer to embodiments wherein a source of amber light (one or more wavelengths in the 580-620 nm wavelength range) and/or a source of red light (one or more wavelengths in the 620-750 nm wavelength range) may be applied. In specific embodiments, at least a source of red light is applied. In other embodiments, only a source of amber light is applied. In yet other embodiments, a source of red light is applied and optionally a source of amber light is applied.

In embodiments, the first spectral power distribution $E_1$, which may be provided during the first time period, may comprises the primary first spectral power $SP(P_1, \Lambda_1)$, the primary second spectral power $SP(P_1, \Lambda_2)$, and the primary amber-red spectral power $SP(P_1, \Lambda_{34})$. The second spectral power distribution $E_2$, which may be provided during the second time period, comprises the secondary first spectral power $SP(P_2, \Lambda_1)$, the secondary second spectral power $SP(P_2, \Lambda_2)$, and the secondary amber-red spectral power $SP(P_2, \Lambda_{34})$.

Especially, in embodiments in the first spectral power distribution there may be (substantial) intensity in the first spectral range $\Lambda_1$, the second spectral range $\Lambda_2$, and the amber-red spectral range $\Lambda_{34}$. Hence, in embodiments $SP(P_1, \Lambda_1) > 0$ Watt, $SP(P_1, \Lambda_2) > 0$ Watt, and $SP(P_1, \Lambda_{34}) > 0$ Watt.

Especially, in embodiments in the second spectral power distribution (during the second time period) there may be (substantial) intensity in the first spectral range $\Lambda_1$; however, the intensity in the second spectral range $\Lambda_2$, and the amber-red spectral range $\Lambda_{34}$, may be reduced, whereby the latter may even be more reduced than the former. Hence, in embodiments $SP(P_2, \Lambda_1) > 0$ Watt, and $SP(P_2, \Lambda_2) > 0$ Watt. Especially, the following may apply: $SP(P2, \Lambda_2)/SP(P_2, \Lambda_1) < SP(P_1, \Lambda_2)/SP(P_1, \Lambda_1)$; Hence, the green may be reduced relative to the blue in the second spectral power distribution. Further, especially the following may also apply: $SP(P_2, \Lambda_{34})/SP(P_2, \Lambda_1) < SP(P_1, \Lambda_{34})/SP(P_1, \Lambda_1)$. Hence, the one or more of amber and red may be reduced relative to the blue in the second spectral power distribution. Further, especially also the following may apply: $SP(P_2, \Lambda_{34})/SP(P_2, \Lambda_2) < SP(P_1, \Lambda_{34})/SP(P_1, \Lambda_2)$. Hence, the one or more of amber and red may also be reduced relative to green in the second spectral power distribution.

In embodiments, the first spectral range $\Lambda_1$ may have one or more wavelengths selected from the wavelength range of 400-470 nm. For instance, in embodiments a first light source may have a peak wavelength within this wavelength range. In other embodiments, a first light source may have a centroid wavelength within this wavelength range.

The term "centroid wavelength", also indicated as kc, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda_c = \Sigma \lambda * I(\lambda)/(\Sigma I(\lambda)$, where the summation is over the wavelength range of interest, and $I(\lambda)$ is the spectral energy density (i.e. the integration of the product of the wavelength and the intensity over the emission band normalized to the integrated intensity).

Further, in embodiments the second spectral range $\Lambda_2$ may have one or more wavelengths selected from the wavelength range of 510-580 nm. For instance, in embodiments a second light source may have a peak wavelength within this wavelength range. In other embodiments, a second light source may have a centroid wavelength within this wavelength range.

Yet further, in embodiments the amber-red spectral range $\Lambda_{34}$ may have one or more wavelengths selected from the wavelength range of 580-750 nm. For instance, in embodiments an amber-red light source may have a peak wavelength within this wavelength range. In other embodiments, an amber-red light source may have a centroid wavelength within this wavelength range. In yet further specific embodiments, two amber-red light sources may be applied, one having a peak wavelength within the amber wavelength range and one having a peak wavelength in the red wavelength range. In other embodiments, two amber-red light sources may be applied, one having a centroid wavelength within the amber wavelength range and one having a centroid wavelength within the red wavelength range. Note that the term "light source" may also refer to a plurality of light sources.

Therefore, in embodiments the first spectral range $\Lambda_1$ may have one or more wavelengths selected from the wavelength range of 400-470 nm, the second spectral range $\Lambda_2$ may have one or more wavelengths selected from the wavelength range of 510-580 nm, the amber-red spectral range $\Lambda_{34}$ may have one or more wavelengths selected from the wavelength range of 580-750 nm.

Especially, in embodiments at least 90% of the spectral power the first spectral range $\Lambda_1$ may be found between 410-470 nm, such as between about 420-470 nm. Especially, in embodiments at least 90% of the spectral power the second spectral range $\Lambda_2$ may be found between about 510-575 nm. Especially, in embodiments at least 90% of the spectral power the amber-red spectral range $\Lambda_{34}$ may be found between about 580-720 nm, such as between about 585-720 nm. Hence, in embodiments at least 90% of the spectral power the first spectral range $\Lambda_1$ may be found between about 420-470 nm, at least 90% of the spectral power the second spectral range $\Lambda_2$ may be found between about 510-575 nm, and at least 90% of the spectral power the amber-red spectral range $\Lambda_{34}$ may be found between about 585-720 nm. In other embodiments, at least 90% of the spectral power the amber-red spectral range $\Lambda_{34}$ may be found between within one or more of the ranges of (i) 580-615 nm and (ii) 620-720 nm.

In embodiments, within the spectral range of 400-750 nm, the first spectral power distribution may comprise three or four emission bands, each having a peak maximum, wherein the peak maxima mutually differ at least 15 nm, such as at least 20 nm. Yet, in specific embodiments within the spectral range of 400-750 nm, the first spectral power distribution may be defined by three or four emission bands, each having a centroid wavelength, wherein the centroid wavelengths mutually differ at least 15 nm, such as at least 20 nm.

As indicated above, in embodiments in the second spectral power distribution (during the second time period) there may be (substantial) intensity in the first spectral range $\Lambda_1$; however, the intensity in the second spectral range $\Lambda_2$, and the amber-red spectral range $\Lambda_{34}$, may be reduced, whereby the latter may even be more reduced than the former.

Especially, in embodiments $SP(P_2, \Lambda_2)/SP(P_2, \Lambda_1) \leq 0.9*SP(P_1, \Lambda_2)/SP(P_1, \Lambda_1)$, such as $SP(P_2, \Lambda_2)/SP(P_2, \Lambda_1) \leq 0.75*SP(P_1, \Lambda_2)/SP(P_1, \Lambda_1)$, may apply. Yet, in embodiments, $SP(P_2, \Lambda_2)/SP(P_2, \Lambda_1) \leq 0.6*SP(P_1, \Lambda_2)/SP(P_1, \Lambda_1)$ may apply. Hence, the green may be reduced relative to the blue in the second spectral power distribution. In yet further specific embodiments, $SP(P_2, \Lambda_2)/SP(P_2, \Lambda_1) > 0.1*SP(P_1, \Lambda_2)/SP(P_1, \Lambda_1)$, such as $SP(P_2, \Lambda_2)/SP(P_2, \Lambda_1) > 0.15*SP(P_1, \Lambda_2)/SP(P_1, \Lambda_1)$, may apply.

Further, especially in embodiments $SP(P_2, \Lambda_{34})/SP*P_2, \Lambda_1) \leq 0.5*SP(P_1, \Lambda_{34})/SP(P_1, \Lambda_1)$, such as $SP(P_2, \Lambda_{34})/SP(P_2, \Lambda_1) \leq 0.25*SP(P_1, \Lambda_{34})/SP(P_1, \Lambda_1)$, may apply. Yet, in embodiments $SP(P_2, \Lambda_{34})/SP(P_2, \Lambda_1) \leq 0.15*SP(P_1, \Lambda_{34})/SP(P_1, \Lambda_1)$ may apply. Hence, the one or more of amber and red may be reduced relative to the blue in the second spectral power distribution.

Further, especially in embodiments $SP(P_2, \Lambda_{34})/SP(P_2, \Lambda_2) \leq 0.65*SP(P_1, \Lambda_{34})/SP(P_1, \Lambda_2)$, such as $SP(P_2, \Lambda_{34})/SP(P_2, \Lambda_2) \leq 0.5*SP(P_1, \Lambda_{34})/SP(P_1, \Lambda_2)$, may apply. Yet, in embodiments $SP(P_2, \Lambda_{34})/SP(P_2, \Lambda_2) \leq 0.4*SP(P_1, \Lambda_{34})/SP(P_1, \Lambda_2)$ may apply. Hence, the one or more of amber and red may also be reduced relative to green in the second spectral power distribution.

As indicated above, for the amber-red wavelength range one or more of red and amber light sources may be applied. It appears that by adding amber to the spectral power distribution (that includes red), the vision of the poultry may be improved. Likewise, by adding red to the spectral power distribution (that includes amber), the vision of the poultry may be improved. This may be beneficial for the rearing. However, in yet other embodiments, the amber-red wavelength range may include essentially only intensity in the amber wavelength range or in the red wavelength range.

Therefore, in embodiments the controllable spectral power distribution may comprise a third spectral range $\Lambda_3$ having one or more wavelengths in the red wavelength range. Especially, the third spectral range $\Lambda_3$ may have one or more wavelengths selected from the range of 620-750 nm. For instance, in embodiments a third light source may have a peak wavelength within this wavelength range. In other embodiments, a third light source may have a centroid wavelength within this wavelength range.

Alternatively or additionally, in embodiments the controllable spectral power distribution may comprise a fourth spectral range $\Lambda_4$ having one or more wavelengths in the amber wavelength range. Especially, the fourth spectral range $\Lambda_4$ may have one or more wavelengths selected from the range of 580-620 nm. For instance, in embodiments a fourth light source may have a peak wavelength within this wavelength range. In other embodiments, a fourth light source may have a centroid wavelength within this wavelength range.

The controllable spectral power distribution may have a primary third spectral power $SP(P_1, \Lambda_3)$ during the first time period $P_1$ and a secondary third spectral power $SP(P_2, \Lambda_3)$ during the second time period $P_2$. Alternatively or additionally, the controllable spectral power distribution may have a primary fourth spectral power $SP(P_1, \Lambda_4)$ during the first time period $P_1$ and a secondary fourth spectral power $SP(P_2, \Lambda_4)$ during the second time period $P_2$. Hence, $SP(P_1, \Lambda_{34})=SP(P_1, \Lambda_3)+SP(P_1, \Lambda_4)$ and $SP(P_2, \Lambda_{34})=SP(P_2, \Lambda_3)+SP(P_2, \Lambda_4)$.

Especially, the first spectral range $\Lambda_1$, the second spectral range $\Lambda_2$, the third spectral range $\Lambda_3$, and the fourth spectral range $\Lambda_4$ are essentially non-overlapping.

Further, especially the first spectral power distribution $E_1$ may comprises the primary third spectral power $SP(P_1, \Lambda_3)$ and the primary fourth spectral power $SP(P_1, \Lambda_4)$, and the second spectral power distribution $E_2$ further comprises the secondary third spectral power $SP(P_2, \Lambda_4)$ and secondary fourth spectral power $SP(P_2, \Lambda_4)$. Especially, in embodiments $SP(P_1, \Lambda_3) > 0$ Watt and $SP(P_1, \Lambda_4) > 0$ Watt.

In specific embodiments $SP(P_2, \Lambda_3)/SP(P_2, \Lambda_1) < SP(P_1, \Lambda_3)/SP(P_1, \Lambda_1)$, such as especially $SP(P_2, \Lambda_3)/SP(P_2, \Lambda_1) \leq 0.25*SP(P_1, \Lambda_3)/SP(P_1, \Lambda_1)$. Yet further, in specific embodiments $SP(P_2, \Lambda_3)/SP(P_2, \Lambda_2) < SP(P_1, \Lambda_3)/SP(P_1, \Lambda_2)$, such as especially $SP(P_2, \Lambda_3)/SP(P_2, \Lambda_2) \leq 0.5*SP(P_1, \Lambda_3)/SP(P_1, \Lambda_2)$. Further, in specific embodiments $SP(P_2, \Lambda_4)/SP(P_2, \Lambda_1) < SP(P_1, \Lambda_4)/SP(P_1, \Lambda_1)$, such as especially $SP(P_2, \Lambda_4)/SP(P_2, \Lambda_1) \leq 0.25*SP(P_1, \Lambda_4)/SP(P_1, \Lambda_1)$. Yet further, in specific embodiments $SP(P_2, \Lambda_4)/SP(P_2, \Lambda_2) < SP(P_1, \Lambda_4)/SP(P_1, \Lambda_2)$, such as especially $SP(P_2, \Lambda_4)/SP(P_2, \Lambda_2) \leq 0.5*SP(P_1, \Lambda_4)/SP(P_1, \Lambda_2)$.

Hence, the amber intensity may also be reduced in the second spectral power distribution (like the red spectral power), relatively more than e.g. the green spectral power may be reduced in the second spectral power distribution. Especially, in embodiments $SP(P_2, \Lambda_4)/SP(P_2, \Lambda_1) \leq 0.05*SP(P_1, \Lambda_4)/SP(P_1, \Lambda_1)$. In embodiments, the control of the amber light may about be the same as the control of red light.

Hence, in specific embodiments the controllable spectral power distribution comprises a fourth spectral range $\Lambda_4$ having one or more wavelengths in the amber wavelength range (especially having one or more wavelengths selected from the range of 580-620 nm), and having a primary fourth spectral power $SP(P_1, \Lambda_4)$ during the first time period $P_1$ and a secondary fourth spectral power $SP(P_2, \Lambda_4)$ during the second time period $P_2$, wherein the first spectral power distribution $E_1$ further comprises the primary fourth spectral power $SP(P_1, \Lambda_4)$; and the second spectral power distribution $E_2$ further comprises the secondary fourth spectral power $SP(P_2, \Lambda_4)$; (c) $SP(P_1, \Lambda_4) > 0$ Watt; (d) $SP(P_2, \Lambda_4)/$ $SP(P_2, \Lambda_1)<SP(P_1, \Lambda_4)/SP(P_1, \Lambda_1)$; and (e) $SP(P_2, \Lambda_4)/SP(P_2, \Lambda_2)<SP(P_1, \Lambda_4)/SP(P_1, \Lambda_2)$.

Therefore, in embodiments the controllable spectral power distribution in the amber-red spectral range $\Lambda_{34}$ may comprise a third spectral range $\Lambda_3$ having one or more wavelengths in the red with one or more wavelengths selected from a wavelength range of 620-750 nm and a fourth spectral range $\Lambda_4$ having one or more wavelengths in the amber wavelength range with one or more wavelengths selected from the range of 580-620 nm. Especially, in embodiments the third spectral range $\Lambda_3$ has a primary third spectral power $SP(P_1, \Lambda_3)$ during the first time period $P_1$ and a secondary third spectral power $SP(P_2, \Lambda_3)$ during the second time period $P_2$. Further, especially in embodiments the fourth spectral range $\Lambda_4$ has a primary fourth spectral power $SP(P_1, \Lambda_4)$ during the first time period $P_1$ and a secondary fourth spectral power $SP(P_2, \Lambda_4)$ during the second time period $P_2$.

In specific embodiments, the first spectral range $\Lambda_1$, the second spectral range $\Lambda_2$, the third spectral range $\Lambda_3$, and the fourth spectral range $\Lambda_4$ are essentially non-overlapping.

Yet further, especially the first spectral power distribution $E_1$ comprises the primary third spectral power $SP(P_1, \Lambda_3)$ and the primary fourth spectral power $SP(P_1, \Lambda_4)$; and the second spectral power distribution $E_2$ further comprises the secondary third spectral power $SP(P_2, \Lambda_3)$ and the secondary fourth spectral power $SP(P_2, \Lambda_4)$. In specific embodiments, $SP(P_1, \Lambda_3)>0$ Watt and $SP(P_1, \Lambda_4)>0$ Watt. Further, in specific embodiments $SP(P_2, \Lambda_3)/SP(P_2, \Lambda_1) \leq 0.25*SP(P_1, \Lambda_3)/SP(P_1, \Lambda_1)$ and $SP(P_2, \Lambda_4)/SP(P_2, \Lambda_1) \leq 0.25*SP(P_1, \Lambda_4)/SP(P_1, \Lambda_1)$. Yet further, in specific embodiments, $SP(P_2, \Lambda_3)/SP(P_2, \Lambda_2) \leq 0.5*SP(P_1, \Lambda_3)/SP(P_1, \Lambda_2)$ and $SP(P_2, \Lambda_4)/SP(P_2, \Lambda_2) \leq 0.5*SP(P_1, \Lambda_4)/SP(P_1, \Lambda_2)$. Hence, in specific embodiments of the light generating system, the controllable spectral power distribution in the amber-red spectral range $\Lambda_{34}$ comprises a third spectral range $\Lambda_3$ having one or more wavelengths in the red with one or more wavelengths selected from a wavelength range of 620-750 nm and a fourth spectral range $\Lambda_4$ having one or more wavelengths in the amber wavelength range with one or more wavelengths selected from the range of 580-620 nm, wherein: (A) the third spectral range $\Lambda_3$ has a primary third spectral power $SP(P_1, \Lambda_3)$ during the first time period $P_1$ and a secondary third spectral power $SP(P_2, \Lambda_3)$ during the second time period $P_2$; (B) the fourth spectral range $\Lambda_4$ has a primary fourth spectral power $SP(P_1, \Lambda_4)$ during the first time period $P_1$ and a secondary fourth spectral power $SP(P_2, \Lambda_4)$ during the second time period $P_2$; (C) the first spectral power distribution $E_1$ comprises the primary third spectral power $SP(P_1, \Lambda_3)$ and the primary fourth spectral power $SP(P_1, \Lambda_4)$; and the second spectral power distribution $E_2$ further comprises the secondary third spectral power $SP(P_2, \Lambda_3)$ and the secondary fourth spectral power $SP(P_2, \Lambda_4)$; (D) $SP(P_1, \Lambda_3)>0$ Watt and $SP(P_1, \Lambda_4)>0$ Watt; (E) $SP(P_2, \Lambda_3)/SP(P_2, \Lambda_1) \leq 0.25*SP(P_1, \Lambda_3)/SP(P_1, \Lambda_1)$ and $SP(P_2, \Lambda_4)/SP(P_2, \Lambda_1) \leq 0.25*SP(P_1, \Lambda_4)/SP(P_1, \Lambda_1)$; and (F) $SP(P_2, \Lambda_3)/SP(P_2, \Lambda_2) \leq 0.5*SP(P_1, \Lambda_3)/SP(P_1, \Lambda_2)$ and $SP(P_2, \Lambda_4)/SP(P_2, \Lambda_2) \leq 0.5*SP(P_1, \Lambda_4)/SP(P_1, \Lambda_2)$.

Note that in specific embodiments, within the amber-red spectral range essentially only wavelengths in the red may be available. In such embodiments $SP(P_1, \Lambda_3)>0$ Watt and $SP(P_1, \Lambda_4)=0$ Watt; in such embodiments of course also $SP(P_2, \Lambda_4)=0$ Watt. Alternatively, in specific embodiments, within the amber-red spectral range essentially only wavelengths in the amber may be available. In such embodiments $SP(P_1, \Lambda_4)>0$ Watt and $SP(P_1, \Lambda_3)=0$ Watt; in such embodiments of course also $SP(P_2, \Lambda_3)=0$ Watt.

In specific embodiments, the intensity in the amber wavelength range in the second period is relatively low. In further specific embodiments, $SP(P_2, \Lambda_{34})/SP(P_2, \Lambda_1) \leq 0.05*SP(P_1, \Lambda_{34})/SP(P_1, \Lambda_1)$.

Further, adding one or more of UV light or deep blue light may be useful, especially for the poultry. Hence, in embodiments the controllable spectral power distribution may comprise a fifth spectral range $\Lambda_5$ having one or more wavelengths in one or more of UV light or deep blue. Especially, the fifth spectral range $\Lambda_5$ may have one or more wavelengths selected from the range of 360-400 nm. For instance, in embodiments a fifth light source may have a peak wavelength within this wavelength range. In other embodiments, a fifth light source may have a centroid wavelength within this wavelength range. The controllable spectral power distribution may have a primary fifth spectral power $SP(P_1, \Lambda_5)$ during the first time period $P_1$ and a secondary fifth spectral power $SP(P_2, \Lambda_5)$ during the second time period $P_2$.

Especially, in embodiments the first spectral range $\Lambda_1$, the second spectral range $\Lambda_2$, the amber-red spectral range $\Lambda_{34}$, the optional fourth spectral range $\Lambda_4$, and the fifth spectral range $\Lambda_5$ are essentially non-overlapping.

Further, in embodiments the first spectral power distribution $E_1$ further comprises the primary fifth spectral power $SP(P_1, \Lambda_5)$, and the second spectral power distribution $E_2$ further comprises the secondary fifth spectral power $SP(P_2, \Lambda_5)$. Especially, in embodiments $SP(P_1, \Lambda_5)>0$ Watt, $SP(P_2, \Lambda_5)>0$ Watt. Further, in embodiments $0.7 \leq SP(P_2, \Lambda_5)/SP(P_2, \Lambda_1)/SP(P_1, \Lambda_5)/SP(P_1, \Lambda_1)$ 1.35, especially $0.8 \leq SP(P_2, \Lambda_5)/SP(P_2, \Lambda_1)/SP(P_1, \Lambda_5)/SP(P_1, \Lambda_1) \leq 1.25$, such as $0.9 \leq SP(P_2, \Lambda_5)/SP(P_2, \Lambda_1)/SP(P_1, \Lambda_5)/SP(P_1, \Lambda_1) \leq 1.1$. Hence, the blue and the deep blue/UV may be controlled in essentially the same way.

Therefore, in embodiments the controllable spectral power distribution comprises a fifth spectral range $\Lambda_5$ having one or more wavelengths in the wavelength range of 360-400 nm, and having a primary fifth spectral power $SP(P_1, \Lambda_5)$ during the first time period $P_1$ and a secondary fifth spectral power $SP(P_2, \Lambda_5)$ during the second time period $P_2$, wherein the first spectral power distribution $E_1$ further comprises the primary fifth spectral power $SP(P_1, \Lambda_5)$; and the second spectral power distribution $E_2$ further comprises the secondary fifth spectral power $SP(P_2, \Lambda_5)$; (c) $SP(P_1, \Lambda_5)>0$ Watt, $SP(P_2, \Lambda_5)>0$ Watt; and (d) $0.8 \leq SP(P_2, \Lambda_5)/SP(P_2, \Lambda_1)/SP(P_1, \Lambda_5)/SP(P_1, \Lambda_1) \leq 1.25$.

Note that even though the contribution in the spectral wavelength range is indicated with fifth spectral range and fifth spectral power, etc., it does not necessarily imply that the fifth contribution is only included when also the fourth contribution is included. Hence, in embodiments the first spectral power distribution $E_1$ comprises the primary first spectral power $SP(P_1, \Lambda_1)$, the primary second spectral power $SP(P_1, \Lambda_2)$, and the primary third spectral power $SP(P_1, \Lambda_3)$; and the second spectral power distribution $E_2$ comprises the secondary first spectral power $SP(P_2, \Lambda_1)$, the secondary second spectral power $SP(P_2, \Lambda_2)$, and the secondary third spectral power $SP(P_2, \Lambda_3)$.

In other embodiments, the first spectral power distribution $E_1$ comprises the primary first spectral power $SP(P_1, \Lambda_1)$, the primary second spectral power $SP(P_1, \Lambda_2)$, the primary third spectral power $SP(P_1, \Lambda_3)$, and the primary fourth spectral power $SP(P_1, \Lambda_4)$; and the second spectral power distribution $E_2$ comprises the secondary first spectral power $SP(P_2, \Lambda_1)$, the secondary second spectral power $SP(P_2, \Lambda_2)$, the secondary third spectral power $SP(P_2, \Lambda_3)$, and the secondary fourth spectral power $SP(P_2, \Lambda_4)$.

In yet other embodiments, the first spectral power distribution $E_1$ comprises the primary first spectral power $SP(P_1, \Lambda_1)$, the primary second spectral power $SP(P_1, \Lambda_2)$, the primary third spectral power $SP(P_1, \Lambda_3)$, the primary fourth spectral power $SP(P_1, \Lambda_4)$, and the primary fifth spectral power $SP(P_1, \Lambda_5)$; and the second spectral power distribution $E_2$ comprises the secondary first spectral power $SP(P_2, \Lambda_1)$, the secondary second spectral power $SP(P_2, \Lambda_2)$, the secondary third spectral power $SP(P_2, \Lambda_3)$, the secondary fourth spectral power $SP(P_2, \Lambda_4)$, and the secondary fifth spectral power $SP(P_2, \Lambda_5)$.

In yet other embodiments, the first spectral power distribution $E_1$ comprises the primary first spectral power $SP(P_1, \Lambda_1)$, the primary second spectral power $SP(P_1, \Lambda_2)$, the primary third spectral power $SP(P_1, \Lambda_3)$, and the primary fifth spectral power $SP(P_1, \Lambda_5)$; and the second spectral power distribution $E_2$ comprises the secondary first spectral power $SP(P_2, \Lambda_1)$, the secondary second spectral power $SP(P_2, \Lambda_2)$, the secondary third spectral power $SP(P_2, \Lambda_3)$, and the secondary fifth spectral power $SP(P_2, \Lambda_5)$. Hence, in specific embodiments the primary and secondary fourth spectral powers may in embodiments be essentially absent (e.g. zero Watt or an intensity less than about 2% of the primary and secondary first power, respectively).

In yet other embodiments, the first spectral power distribution $E_1$ comprises the primary first spectral power $SP(P_1, \Lambda_1)$, the primary second spectral power $SP(P_1, \Lambda_2)$, and the primary fourth spectral power $SP(P_1, \Lambda_3)$; and the second spectral power distribution $E_2$ comprises the secondary first spectral power $SP(P_2, \Lambda_1)$, the secondary second spectral power $SP(P_2, \Lambda_2)$, and the secondary fourth spectral power $SP(P_2, \Lambda_4)$. Hence, in specific embodiments the primary and secondary third spectral powers may in embodiments be essentially absent (e.g. zero Watt or an intensity less than about 2% of the primary and secondary first power, respectively).

In yet other embodiments, the first spectral power distribution $E_1$ comprises the primary first spectral power $SP(P_1, \Lambda_1)$, the primary second spectral power $SP(P_1, \Lambda_2)$, the primary fourth spectral power $SP(P_1, \Lambda_4)$, and the primary fifth spectral power $SP(P_1, \Lambda_5)$; and the second spectral power distribution $E_2$ comprises the secondary first spectral power $SP(P_2, \Lambda_1)$, the secondary second spectral power $SP(P_2, \Lambda_2)$, the secondary fourth spectral power $SP(P_2, \Lambda_4)$, and the secondary fifth spectral power $SP(P_2, \Lambda_5)$. Hence, in specific embodiments the primary and secondary third spectral powers may in embodiments be essentially absent (e.g. zero Watt or an intensity less than about 2% of the primary and secondary first power, respectively).

The primary first spectral power $SP(P_1, \Lambda_1)$, the primary second spectral power $SP(P_1, \Lambda_2)$, the primary amber-red spectral power $SP(P_1, \Lambda_{34})$, may have an average primary spectral power Pa. Especially, for the primary first spectral power $SP(P_1, \Lambda_1)$, the primary second spectral power $SP(P_1, \Lambda_2)$, the primary amber-red spectral power $SP(P_1, \Lambda_{34})$ may apply that they may differ from the average primary spectral power Pa within +/−20% of the average primary spectral power Pa. Would one or more of the primary fourth spectral power $SP(P_1, \Lambda_4)$ and primary fifth spectral power $SP(P_1, \Lambda_5)$ be available in the first spectral power distribution, especially for the one or more of the primary fourth spectral power $SP(P_1, \Lambda_4)$ and primary fifth spectral power $SP(P_1, \Lambda_5)$ may apply that they may differ from the average primary spectral power Pa within +/−20% of the average primary spectral power Pa (defined by the average of the primary first spectral power $SP(P_1, \Lambda_1)$, the primary second spectral power $SP(P_1, \Lambda_2)$, the primary amber-red spectral power $SP(P_1, \Lambda_{34})$.

The invention also provides (in an aspect and/or embodiments) a light generating system, wherein the light generating system is configured to generate system light having a controllable spectral power distribution and intensity, wherein in an operational mode the light generating system is configured to generate during a first time period $P_1$, a first spectral power distribution $E_1$, and during a second time period $P_2$, later in time than the first period $P_1$, a second spectral power distribution $E_2$, wherein in specific embodiments: (A) the controllable spectral power distribution comprises (a) a first spectral range $\Lambda_1$ having one or more wavelengths in the blue, and having a primary first spectral power $SP(P_1, \Lambda_1)$ during the first time period $P_1$ and a secondary first spectral power $SP(P_2, \Lambda_1)$ during the second time period $P_2$, (b) a second spectral range $\Lambda_2$ having one or more wavelengths in the green, and having a primary second spectral power $SP(P_1, \Lambda_2)$ during the first time period $P_1$ and a secondary second spectral power $SP(P_2, \Lambda_2)$ during the second time period $P_2$, and (c) a third spectral range $\Lambda_3$ having one or more wavelengths in the red, and having a primary third spectral power $SP(P_1, \Lambda_3)$ during the first time period $P_1$ and a secondary third spectral power $SP(P_2, \Lambda_3)$ during the second time period $P_2$; (B) the first spectral range $\Lambda_1$, the second spectral range $\Lambda_2$, and the third spectral range $\Lambda_3$ are non-overlapping; (C) the first spectral power distribution $E_1$ comprises the primary first spectral power $SP(P_1, \Lambda_1)$, the primary second spectral power $SP(P_1, \Lambda_2)$, and the primary third spectral power $SP(P_1, \Lambda_3)$; the second spectral power distribution $E_2$ comprises the secondary first spectral power $SP(P_2, \Lambda_1)$, the secondary second spectral power $SP(P_2, \Lambda_2)$, and the secondary third spectral power $SP(P_2, \Lambda_3)$; (E) the first period $P_1$ is selected from of at least part of a day; the second period $P_2$ is selected from the range of at least part of a day; (F) $SP(P_1, \Lambda_1)>0$ Watt, $SP(P_1, \Lambda_2)>0$ Watt, and $SP(P_1, \Lambda_3)>0$ Watt; $SP(P_2, \Lambda_1)>0$ Watt, and $SP(P_2, \Lambda_2)>0$ Watt; $SP(P_2, \Lambda_2)/SP(P_2, \Lambda_1)<SP(P_1, \Lambda_2)/SP(P_1, \Lambda_1)$; $SP(P_2, \Lambda_3)/SP(P_2, \Lambda_1)<SP(P_1, \Lambda_3)/SP(P_1, \Lambda_1)$; and $SP(P_2, \Lambda_3)/SP(P_2, \Lambda_2)<SP(P_1, \Lambda_3)/SP(P_1, \Lambda_2)$. Especially, in such aspect and/or embodiments, $SP(P_1, \Lambda_4)=0$ Watt (and $SP(P_2, \Lambda_4)=0$ Watt).

As indicated above, the first spectral power distribution may especially be provided during a first part of the rearing period ("first rearing period $RP_1$") and the second spectral power distribution may especially during a second part of the rearing period ("second rearing period $RP_2$"). The first spectral power distribution may especially be useful in the first days of the chicks and the second spectral power distribution may especially be useful for the period of time after these first days.

These first days may especially be about the first 5-20 days (from hatch), such as about the first 10 days. Especially, the (artificial) light provided to the poultry during the first part of the rearing period may essentially consist of the first spectral power distribution. Hence, in embodiments during this second rearing period $RP_2$, essentially exclusively the (artificial) light provided to the poultry during the first part of the rearing period may essentially consist of the first spectral power distribution.

During the period after these first days, i.e. the period after the first rearing period $RP_1$, the (artificial) light provided to the poultry during the first part of the rearing period may in general for most of the time essentially consist of the first spectral power distribution. Especially, this period may last for at least 10 days.

The first spectral power distribution during the first rearing period $RP_1$ may in embodiments gradually change to the second spectral power distribution during the second rearing period $RP_2$. This change may be executed over less than one day up to over a few days. Hence, there may in embodiments be about 1-5 days, especially 1-3 days wherein the spectral power distribution may be a comprise the first spectral power distribution and the second spectral power distribution with changing relative contributions over time. In general, the minimum number of days that first time periods with the first spectral power distribution is provided during the first rearing period may be at least 5 days. Hence, for instance the first rearing period may comprise 5 days with the first periods with the first spectral power distribution, followed by the second rearing period that starts first with a gradual change from the first spectral power distribution to the second spectral power distribution. The number of days that during the second rearing period at least second periods of light with the second spectral power distribution are provided may be at least 5, even more especially at least 10.

Hence, in embodiments in the operational mode during a first rearing period $RP_1$ selected from the range of 5-20 days, each day during the first time period $P_1$ system light with the first spectral power distribution $E_1$ is provided, and subsequently during a second rearing period $RP_2$ selected from the range of at least 10 days, each day during the second time period $P_2$ system light with the second spectral power distribution $E_2$ is provided.

For broiler chickens, the second rearing period may be shorter than for e.g. juvenile breeding stock or layer stock. Hence, in embodiments, especially for broiler chickens, the first rearing period $RP_1$ may be selected from the range of 5-14 days, and the second rearing period $RP_2$ may be selected from the range of at least 40-60 days. In other embodiments, especially for juvenile breeding stock or layer stock, the first rearing period $RP_1$ may be selected from the range of 5-14 days, and the second rearing period $RP_2$ may be selected from the range of at least 70-140 days.

The day the chicks hatch and/or are removed from the incubator is indicated as Day 0.

In embodiments, it may be desirable to not only control the spectral power distribution, but also to control the intensity of the light. In embodiments, it appears useful to have a lower intensity of the light during the second rearing period relative to the first rearing period. Hence, in embodiments in the operational mode the lighting system may be configured to (i) provide the system light with the first spectral power distribution $E_1$ during the first rearing period $RP_1$ (each day during the first time period $P_1$ system light) with a first luminous flux $lm_1$, and (ii) provide the system light with the second spectral power distribution $E_2$ during the second rearing period $RP_2$ (each day during the second time period $P_2$ system light) with a second luminous flux $lm_2$, wherein in average over the respective rearing periods $lm_2<lm_1$. For instance, in embodiments in average over the respective rearing periods $0.02 \le lm_2/lm_1 \le 0.5$. However, in other embodiments the luminous flux may stay essentially constant over the entire rearing period.

The light generating system may further comprise a control system or may be functionally coupled to the control system. Hence, in embodiments the light generating system may further comprise a control system, configured to control the controllable spectral power distribution and intensity of the system light. Further, the light generating system may comprise a sensor, which may be functionally coupled to control system. Especially, in embodiments the light generating system may further comprising (i) a control system, configured to control the controllable spectral power distribution and intensity of the system light, and (ii) a sensor, wherein the control system is configured to control the controllable spectral power distribution and intensity in dependence of a sensor signal of the sensor.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In embodiments, the sensor may comprise one or more of an optical sensor, a thermal sensor, a sound sensor, etc. In embodiments, the sensor may comprise a (digital) camera. The term "sensor" may also refer to a plurality of sensors, and in specific embodiments to a plurality of different types of sensor. In specific embodiments, multiple cameras may be configured to sense the animal residence. In yet further specific embodiments, multiple cameras may be configured in the animal residence, such as in a stable or in a ren. Hence, in embodiments the activation system may be controlled in dependence of a sensor signal of a sensor.

In specific embodiments, the sensor may be used to monitor animal behavior. Alternatively or additionally, the sensor may be used to monitor rearing progress. In embodiments, in dependence of a sensor signal of the sensor, the control system may control one or more of the spectral power distribution and the intensity. Alternatively or additionally, in dependence of a sensor signal of the sensor, the control system may control one or more of the spectral power distribution and the intensity locally in the animal residence. Hence, also during the first rearing period and/or during the second rearing period, the spectral power distribution may vary, especially within the herein indicated respective ranges, e.g. as function of animal behavior. Alternatively or additionally, in embodiments during the second rearing period, it may be desirable to active the poultry. Hence, in specific embodiments the sensor and control system may be configured to monitor poultry behavior (and/or rearing progress), and the control system may be configured to provide during the second rearing period $RP_2$ (see also above) one or more pulses of system light having the first spectral power distribution $E_1$ with a first pulse duration $P_3$, wherein the pulse duration $P_3$ is selected from the range of at maximum 4 hours. For instance, the pulse duration could be selected from the range of 5 seconds to 4 hours, like at least 10 second. In embodiments, a pulse interval may be selected from 5 seconds to 10 hours, or even longer. Hence, in embodiments a single pulse may be provided during the entire second rearing period. In other embodiments a plurality of pulses may be provided, either during the same day and/or distributed over multiple days.

In yet a further aspect, the invention also provides an animal farm system comprising a poultry residence and the light generating system as described herein for providing system light in the poultry residence. In specific embodiments, the light generating system may comprise one or more light generating devices configured to generate the system light.

The animal residence may be a shed, a barn, a stable, a run. Hence, in specific embodiments the animal residence may comprise a stable or a barn. For instance, in embodiments the animal residence may be a chicken run for chicken. The animal residence may especially be an indoor residence. In other embodiments, the animal residence may be an outdoor animal residence like an outdoor area that is in one or another way fenced or otherwise closed with a barrier like a wall, a trench, or water, etc. In the latter embodiments, the system light may e.g. be provided during at least part of the dark periods (night times).

The animal farm system may comprise a control system (see also above). In such embodiments, the control system may also control one or more other aspects, like one or more of temperature in the residence, air composition in the residence, humidity in the residence, supply of food to the animals, supply of water to the animals, supply of sound to the animals, provision of enrichment sources or devices, provision of medication, grooming or conditioning of litter or waste removal, etc. In embodiments, the control system may control the one or more other aspects in dependence of the above-described sensor (e.g. for monitoring animal behavior and/or rearing progress).

In yet a further aspect, the invention also provides a method for providing system light in a poultry residence, wherein the method comprises providing the system light with the light generating system.

For instance, in embodiments the animal residence, such as the poultry residence, may be a residence configured to rear one or more of chickens, turkeys, ducks, geese, pheasants, quails, guinea fowls, and heritage breed chickens.

In a specific embodiment, the above-described light generating system may be comprised in a light generating device. In embodiments, the light generating device may comprise a plurality of light sources. The light generating device may e.g. comprise a house hosting one or more light sources. The light generating device may especially be configured to generate device light. In embodiments, the device light may essentially consist of the system light.

In specific embodiments, the poultry light generating device may comprise a first electric circuit, a second electric circuit, one or more first light sources, one or more second light sources and one or more amber-red light sources. Further, the wherein poultry light generating device may comprise the control system (see also above). Especially, in embodiments the one or more first light sources may be configured to generate first light source light having the one or more wavelengths in the blue. Further, in embodiments the one or more second light sources may be configured to generate second light source light having the one or more wavelengths in the green. Yet further, in embodiments the one or more amber-red light sources may be configured to generate amber-red light source light having the one or more wavelengths in the amber-red. Yet further, in embodiments the one or more first light sources are functionally coupled to the first electric circuit, the one or more amber-red light sources are functionally coupled to the second electric circuit.

Especially, in embodiments one or more of the following may apply: (i) the one or more second light sources are functionally coupled to a third electric circuit, and (ii) one or more of the one or more second light sources are functionally coupled to the first electric circuit and one or more of the one or more second light sources are functionally coupled to the second electric circuit; and (e) the control system is configured to control the one or more first light sources, the one or more second light sources, and the one or more amber-red light sources.

Hence, in specific embodiments the poultry light generating device may comprise a first electric circuit, a second electric circuit, one or more first light sources, one or more second light sources and one or more amber-red light sources, and wherein the wherein poultry light generating device comprises the a control system; wherein: (a) the one or more first light sources are configured to generate first light source light having the one or more wavelengths in the blue; (b) the one or more second light sources are configured to generate second light source light having the one or more wavelengths in the green; (c) the one or more amber-red light sources are configured to generate amber-red light source light having the one or more wavelengths in the amber-red; (d) the one or more first light sources are functionally coupled to the first electric circuit, the one or more amber-red light sources are functionally coupled to the second electric circuit, and wherein one or more of the following applies: (i) the one or more second light sources are functionally coupled to a third electric circuit, and (ii) one or more of the one or more second light sources are functionally coupled to the first electric circuit and one or more of the one or more second light sources are functionally coupled to the second electric circuit; and (e) the control system is configured to control the one or more first light sources, the one or more second light sources, and the one or more amber-red light sources.

In embodiments, the amber-red light sources comprise red (light emitting) light sources. In other embodiments, the amber-red light sources comprise amber (light emitting) light sources. In further specific embodiments, the amber-red light sources comprise red (light emitting) light sources and amber (light emitting) light sources.

As indicated above, in embodiments there may also be one or more of fourth light sources and fifth light sources. In embodiments, the fourth light sources may be functionally coupled to a fourth electric circuit. In yet other embodiments, the fourth light sources may be functionally coupled to the second electric circuit. In embodiments, the fifth light sources may be functionally coupled to a fifth electric circuit. In yet other embodiments, the fifth light sources may be functionally coupled to the first electric circuit.

In embodiments, the animal farm system may comprise a plurality of such light generating devices. The one or more light generating devices comprised by the animal farm system may be configured to generate the system light as described above.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing.

The light generating system may comprise one or more lamps or luminaires to provide the system light. In embodiments, each lamp or luminaire as such may be configured to provide the system light. In other embodiments, different lamps or luminaires may be configured to provide together the system light, such as a red emitting lamp, a green emitting lamp, and a blue emitting lamp. In other embodiments, different lamps or luminaires may be configured to provide together the system light, such as (i) an amber emitting lamp and/or a red emitting lamp, (ii) a green emitting lamp, (iii) a blue emitting lamp, and optionally an UV emitting lamp.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
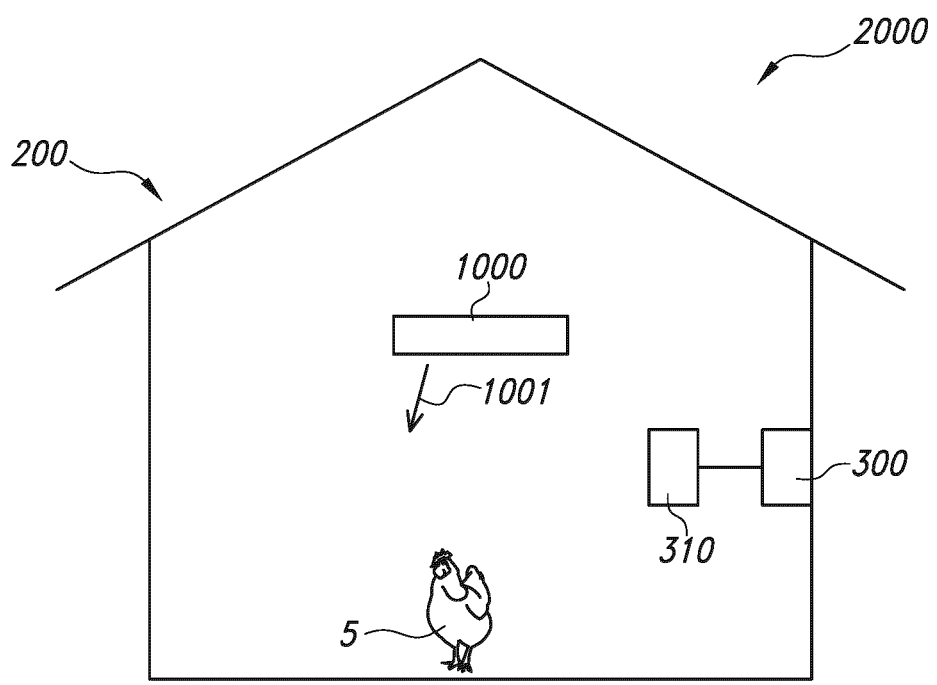
FIGS. 1a-1d schematically depict some embodiments, aspects and variants.

FIG. 1a schematically depicts a poultry residence 200 comprising a light generating system 1000. The light generating system 1000 of the invention may in embodiments especially be used for lighting in a poultry residence 200 with system light 1001. The light generating system 1000 is configured to generate the system light 1001 having a controllable spectral power distribution and intensity. The light generating system 1000 may further comprise a control system 300. The control system 300 may especially be configured to control the controllable spectral power distribution and intensity of the system light 1001. The light generating system 1000 may further comprise a sensor 310. In specific embodiments, the control system 300 may be configured to control the controllable spectral power distribution and intensity in dependence of a sensor signal of the sensor 310.

FIG. 1a effectively also schematically depicts an animal farm system 2000 comprising a poultry residence 200 and the light generating system 1000 for providing system light 1001 in the poultry residence 200. Especially, the light generating system 1000 may comprise one or more light generating devices 100 configured to generate the system light 1001. Hence, the invention may further provide a method for providing system light 1001 in a poultry residence 200. In embodiments, the method may comprise providing the system light 1001 with the light generating system 1000. The invention may further provide a method for providing system light 1001 in a poultry residence 200 of an animal farm system 2000. In embodiments, the method may comprise providing the system light 1001 with the light generating system 1000. The poultry residence 200 may be a residence configured to rear one or more of chickens, turkeys, ducks, geese, pheasants, quails, guinea fowls, and heritage breed chickens.

Figure 1B:
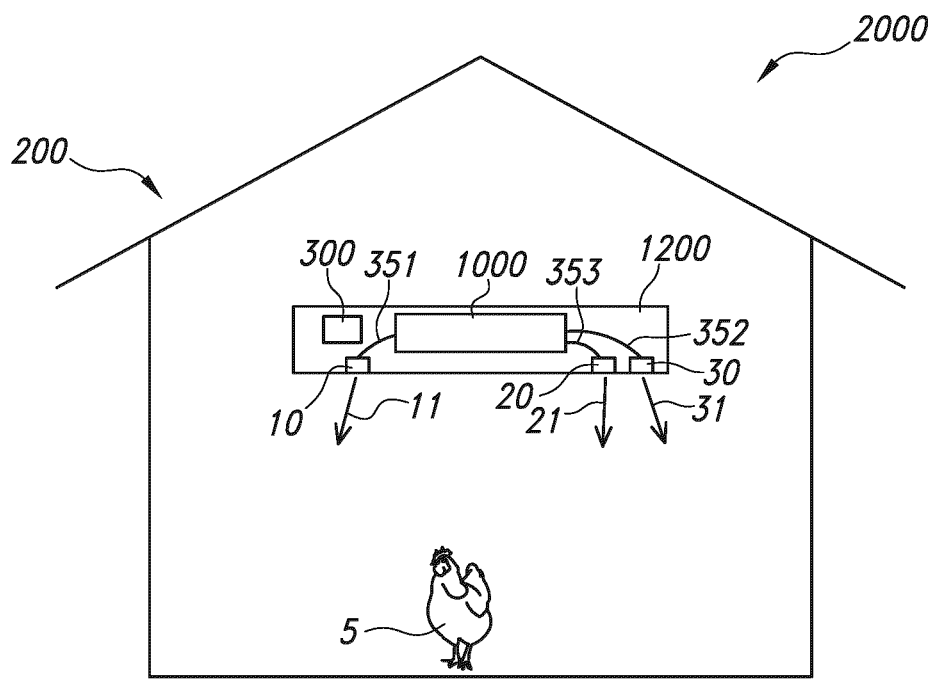

FIG. 1b schematically depicts a specific embodiment of the light generating system, wherein the light generating system 1000 is comprised by a light generating device 1200. Embodiments of the light generating device 1200 are further depicted in more detail in FIG. 1c.

Figure 1C:
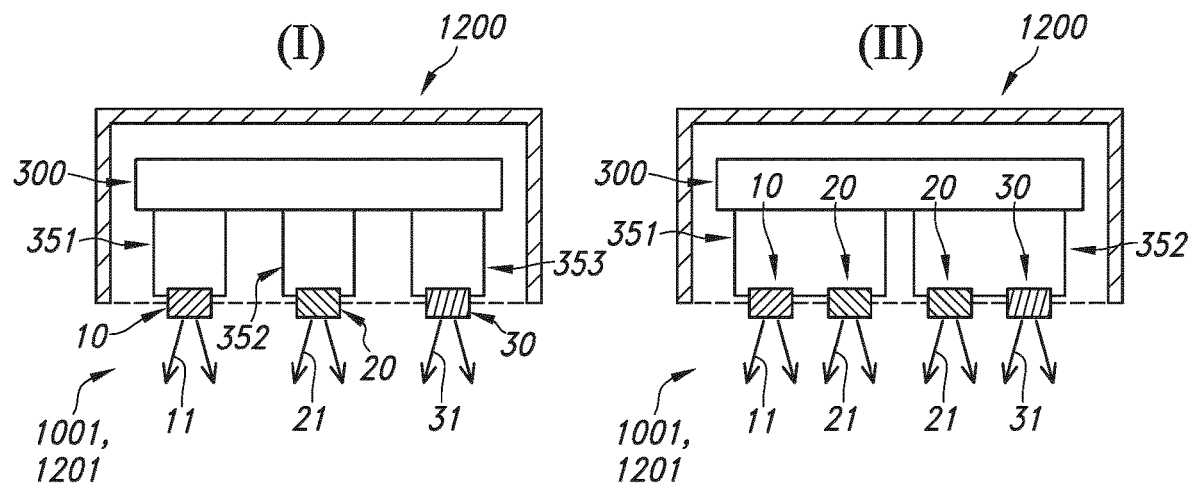

Referring to FIGS. 1b and 1c, the invention may comprise a poultry lighting device 1200 comprising the light generating system 1000. Especially, the poultry lighting device 1200 may in embodiments comprise a first electric circuit 351, a second electric circuit 352, one or more first light sources 10, one or more second light sources 20 and one or more amber-red light sources 30. In specific embodiments, the poultry lighting device 1200 may comprise a control system 300.

In embodiments, the one or more first light sources 10 may be configured to generate first light source light 11 having the one or more wavelengths in the blue. Additionally or alternatively, the one or more second light sources 20 may be configured to generate second light source light 21 having the one or more wavelengths in the green. Additionally or alternatively, the one or more amber-red light sources 30 may be configured to generate amber-red light source light 31 having the one or more wavelengths in the amber-red. In specific embodiments, the one or more first light sources 10 may be functionally coupled to the first electric circuit 351 and the one or more amber-red light sources 30 may be functionally coupled to the electric second circuit 352. In specific embodiments, the one or more second light sources 20 may be functionally coupled to a third electric circuit 353. Additionally or alternatively, one or more of the one or more second light sources 20 may be functionally coupled to the first electric circuit 351 and one or more of the one or more second light sources 20 may be functionally coupled to the second electric circuit 352.

Especially the control system 300 may in embodiments be configured to control the one or more first light sources 10, the one or more second light sources 20, and the one or more amber-red light sources 30.

Figure 1D:
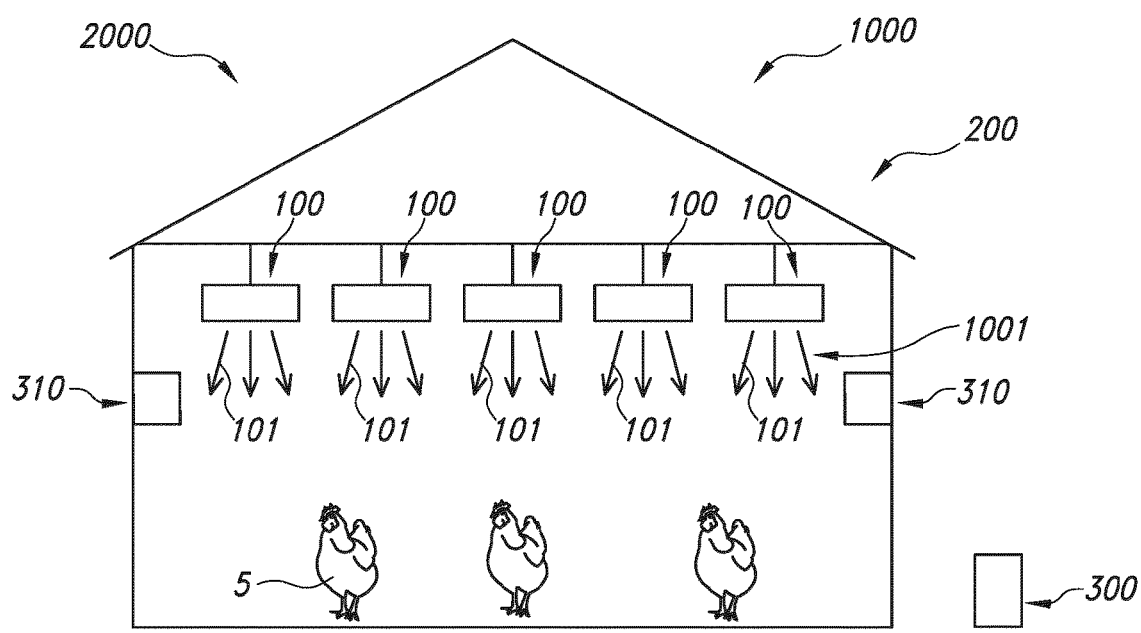

FIG. 1d schematically depicts an embodiment wherein the light generating system 1000 comprises a plurality of light generating devices 100, which may be configured to generate device light 101, and which may together provide the system light 1001. In dependence upon one or more sensors 310, the control system may e.g. locally control the spectral power distribution of the system light 1001.

Figure 2A:
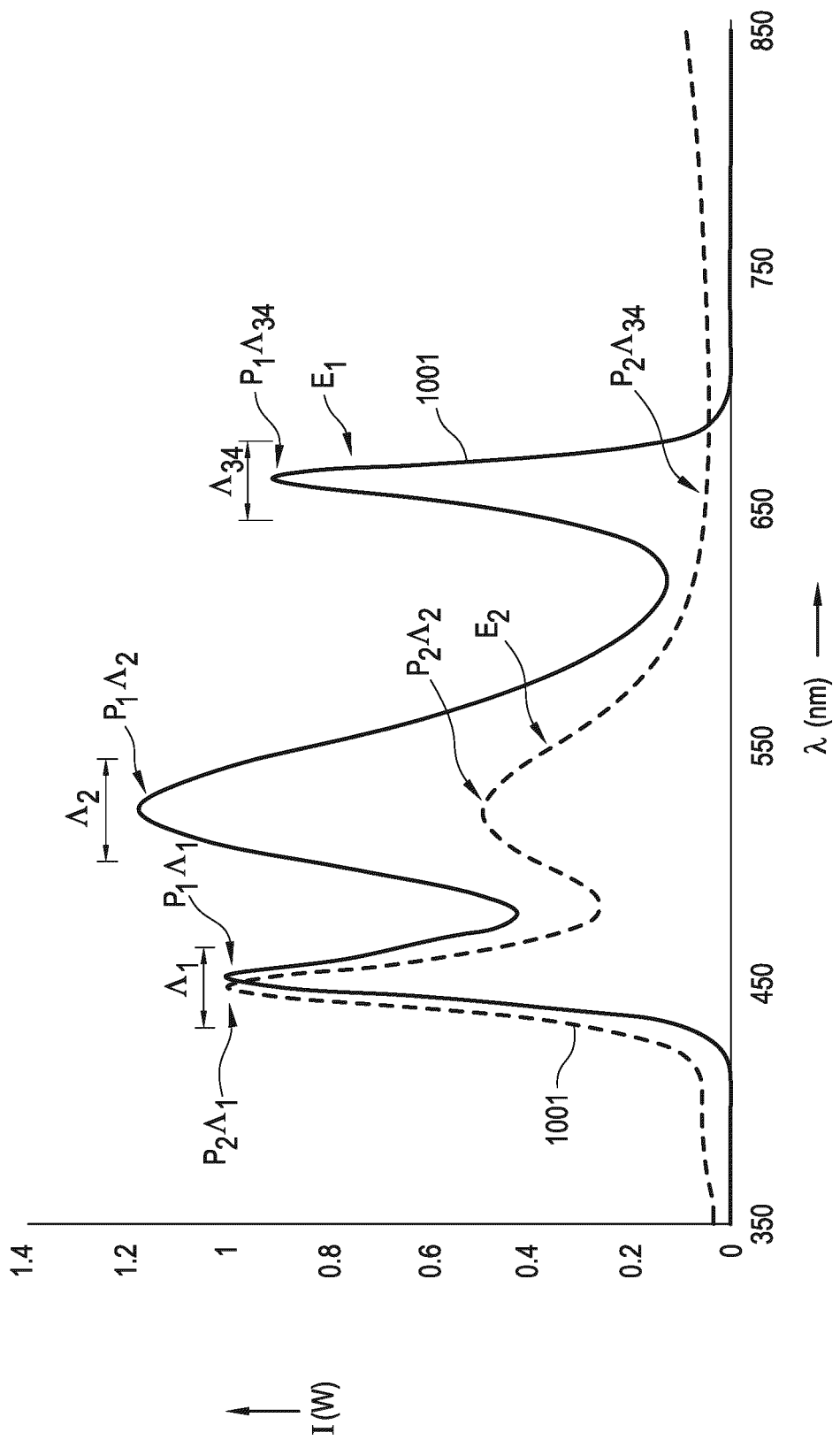
FIGS. 2a-2e schematically depict some aspects and variants.

FIG. 2a schematically depicts a first spectral power distribution $E_1$ and a second spectral power distribution $E_2$. Referring also to FIGS. 1a-1d, in an operational mode the light generating system 1000 may in embodiments be configured to generate during a first time period $P_1$, a first spectral power distribution $E_1$, and during a second time period $P_2$, later in time than the first period $P_1$, a second spectral power distribution $E_2$.

In embodiments, the controllable spectral power distribution may comprise a first spectral range $\Lambda_1$ having one or more wavelengths in the blue, and having a primary first spectral power $SP(P_1, \Lambda_1)$ during the first time period $P_1$ and a secondary first spectral power $SP(P_2, \Lambda_1)$ during the second time period $P_2$. In embodiments, the controllable spectral power distribution may comprise a second spectral range $\Lambda_2$ having one or more wavelengths in the green, and having a primary second spectral power $SP(P_1, \Lambda_2)$ during the first time period $P_1$ and a secondary second spectral power $SP(P_2, \Lambda_2)$ during the second time period $P_2$. In embodiments, the controllable spectral power distribution may comprise a amber-red spectral range $\Lambda_{34}$ having one or more wavelengths in the amber-red, and having a primary amber-red spectral power $SP(P_1, \Lambda_{34})$ during the first time period $P_1$ and a secondary amber-red spectral power $SP(P_2, \Lambda_{34})$ during the second time period $P_2$.

In specific embodiments, the first spectral range $\Lambda_1$, the second spectral range $\Lambda_2$, and the amber-red spectral range $\Lambda_{34}$ may essentially be non-overlapping.

The first spectral power distribution $E_1$ may in embodiments comprise the primary first spectral power $SP(P_1, \Lambda_1)$, the primary second spectral power $SP(P_1, \Lambda_2)$, and the primary amber-red spectral power $SP(P_1, \Lambda_{34})$. The second spectral power distribution $E_2$ may in embodiments comprise the secondary first spectral power $SP(P_2, \Lambda_1)$, the secondary second spectral power $SP(P_2, \Lambda_2)$, and the secondary amber-red spectral power $SP(P_2, \Lambda_{34})$.

In embodiments, the first spectral range $\Lambda_1$ may have one or more wavelengths selected from the wavelength range of 400-470 nm. Additionally or alternatively, the second spectral range $\Lambda_2$ may have one or more wavelengths selected from the wavelength range of 510-580 nm. Additionally or alternatively, the amber-red spectral range $\Lambda_3$ may have one or more wavelengths selected from the wavelength range of 580-750 nm.

Figure 2B:
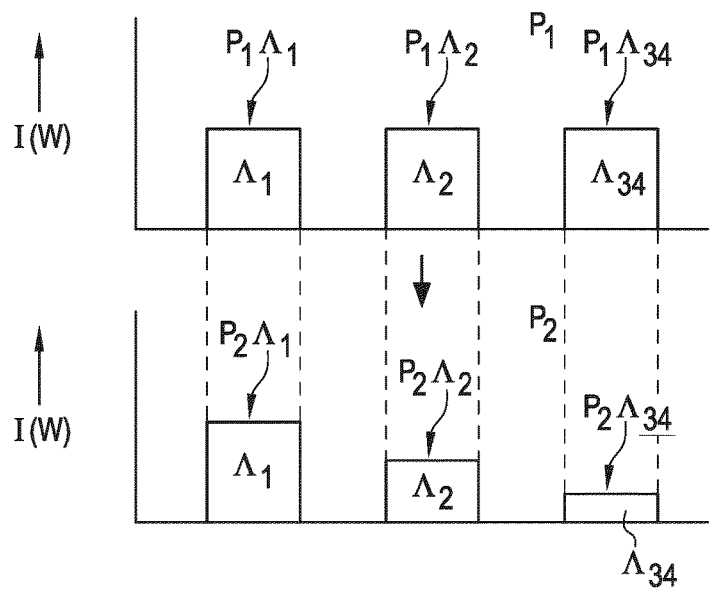

Referring to FIGS. 2a and 2b, in specific embodiments, the first period $P_1$ may be selected from of at least part of a day. In specific embodiments, the second period $P_2$ may be selected from the range of at least part of a day. In embodiments, a day may be defined as 24 hours. In specific embodiments, the primary first spectral power $SP(P_1, \Lambda_1)$, the primary second spectral power $SP(P_1, \Lambda_2)$, and the primary amber-red spectral power $SP(P_1, \Lambda_{34})$ may be emitting in the first spectral power distribution. Essentially, the first spectral power distribution may hence comprise a combination of blue, green and one or more of amber and red light. More especially, in embodiments $SP(P_1, \Lambda_1) > 0$ Watt, $SP(P_1, \Lambda_2) > 0$ Watt, and $SP(P_1, \Lambda_{34}) > 0$ Watt. In specific embodiments, the secondary first spectral power $SP(P_2, \Lambda_1)$ and the secondary second spectral power $SP(P_2, \Lambda_2)$ may be emitting in the second spectral power distribution. Essentially, the second spectral power distribution may hence comprise a combination of blue and green light. More especially, in embodiments $SP(P_2, \Lambda_1) > 0$ Watt, and $SP(P_2, \Lambda_2) > 0$ Watt. In embodiments, during the second time period $P_2$ the green emission may be reduced relative to the blue emission. Especially, $SP(P_2, \Lambda_2)/SP(P_2, \Lambda_1) < SP(P_1, \Lambda_2)/SP(P_1, \Lambda_1)$. In embodiments, during the second time period $P_2$ the one or more of amber and red emission may be reduced relative to the blue emission. Especially, $SP(P_2, \Lambda_{34})/SP(P_2, \Lambda_1) < SP(P_1, \Lambda_{34})/SP(P_1, \Lambda_1)$. In embodiments, during the second time period $P_2$ the one or more of amber and red emission may be reduced relative to the green emission. Especially, $SP(P_2, \Lambda_{34})/SP(P_2, \Lambda_2) < SP(P_1, \Lambda_{34})/SP(P_1, \Lambda_2)$.

Figure 2C:
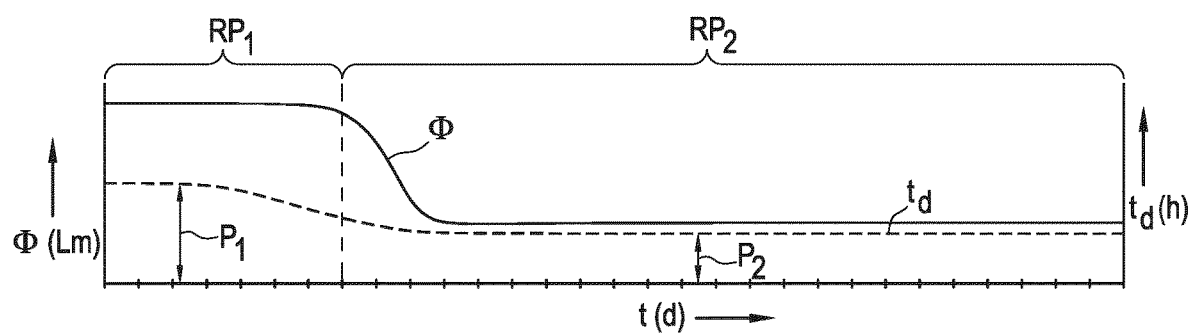

FIG. 2c schematically depicts an embodiment of the emission intensities for the first spectral power distribution $E_1$ (top) and the second spectral power distribution $E_2$ (bottom) for each spectral range.

Referring to FIG. 2c, schematically a rearing period is depicted, with a first rearing period RP1 and a second rearing period RP2. In the operational mode during a first rearing period $RP_1$ selected from the range of 5-20 days, each day during the first time period $P_1$ system light 1001 with the first spectral power distribution $E_1$ may be provided. Subsequently during a second rearing period $RP_2$ selected from the range of at least 10 days, each day during the second time period $P_2$ system light 1001 with the second spectral power distribution $E_2$ may be provided. The first rearing period $RP_1$ may in embodiments be selected from the range of 5-14 days. Additionally or alternatively, the second rearing period $RP_2$ may in embodiments be selected from the range of at least 40-60 days. In specific embodiments, the second rearing period $RP_2$ may be selected from the range of at least 70-140 days.

Referring to FIG. 2c, for instance the first rearing period may comprise 5 days with the first periods with the first spectral power distribution, followed by the second rearing period that starts first with a gradual change from the first spectral power distribution to the second spectral power distribution. The number of days that during the second rearing period at least second periods of light with the second spectral power distribution are provided may be at least 5, even more especially at least 10.

Note that an intensity reduction from the first rear period to the second rearing period is schematically depicted in FIG. 2c. However, this is not necessarily the case. In embodiments the luminous fluxes may also be essentially the same. For instance, in the operational mode, the lighting system 1000 may in embodiments be configured to (i) provide the system light 1001 with the first spectral power distribution $E_1$ during the first rearing period $RP_1$ (each day during the first time period $P_1$ system light 1001) with a first luminous flux $lm_1$. Additionally or alternatively, the lighting system 1000 may in embodiments be configured to provide the system light 1001 with the second spectral power distribution $E_2$ during the second rearing period $RP_2$ (each day during the second time period $P_2$ system light 1001) with a second luminous flux $lm_2$. In specific embodiments, in average over the respective rearing periods $lm_2<lm_1$. Especially, in average over the respective rearing periods $0.02 \leq lm_2/lm_1 \leq 0.5$.

Referring to FIGS. 2a-2c, (the length of) the first period $P_1$ may in embodiments be selected from the range of 8-24 hours. Additionally or alternatively, (the length of) the second period $P_2$ may in embodiments be selected from the range of 8-22 hours. In embodiments $SP(P_2, \Lambda_2)/SP(P_2, \Lambda_1) \leq 0.75*SP(P_1, \Lambda_2)/SP(P_1, \Lambda_1)$. In embodiments $SP(P_2, \Lambda_{34})/SP(P_2, \Lambda_1) \leq 0.25*SP(P_1, \Lambda_{34})/SP(P_1, \Lambda_1)$. In embodiments $SP(P_2, \Lambda_{34})/SP(P_2, \Lambda_2) \leq 0.5*SP(P_1, \Lambda_{34})/SP(P_1, \Lambda_2)$.

Figure 2D:
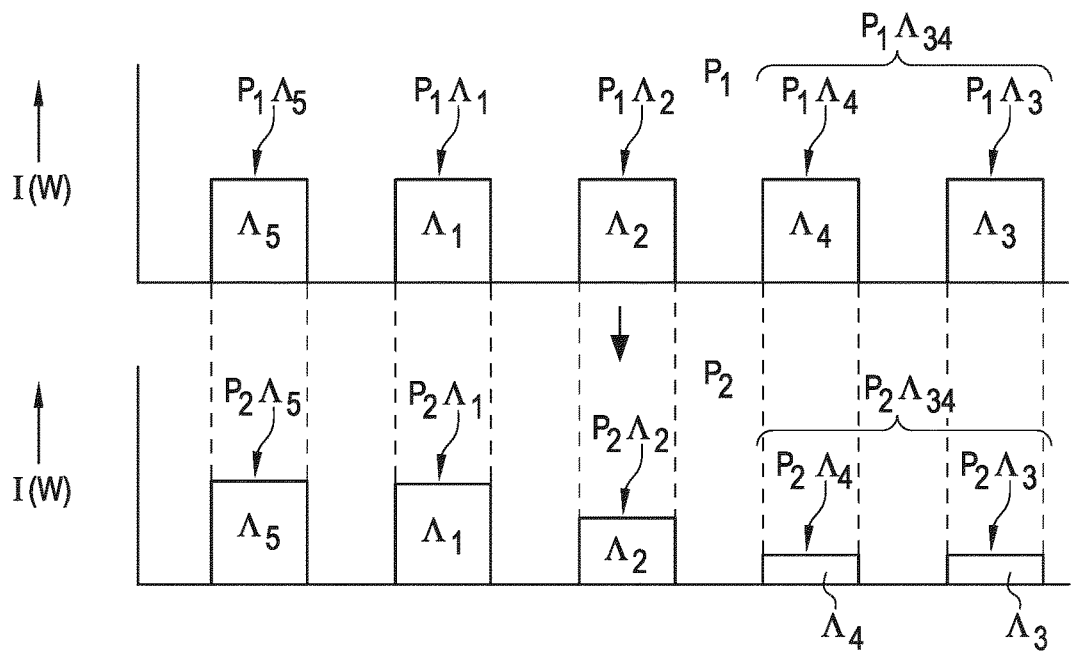

Referring to FIG. 2d, the controllable spectral power distribution may in embodiments comprise a fourth spectral range $\Lambda_4$. Especially, the fourth spectral range $\Lambda_4$ may have one or more wavelengths in the amber wavelength range. More especially the fourth spectral range $\Lambda_4$ may have one or more wavelengths selected from the range of 580-620 nm. In embodiments, the fourth spectral range $\Lambda_4$ may have a primary fourth spectral power $SP(P_1, \Lambda_4)$ during the first time period $P_1$ and a secondary fourth spectral power $SP(P_2, \Lambda_4)$ during the second time period $P_2$. In specific embodiments, the first spectral range $\Lambda_1$, the second spectral range $\Lambda_2$, the amber-red spectral range $\Lambda_{34}$, and the fourth spectral range $\Lambda_4$ may essentially be non-overlapping. Hence, in specific embodiments, the first spectral power distribution $E_1$ may further comprise the primary fourth spectral power $SP(P_1, \Lambda_4)$; and the second spectral power distribution $E_2$ may further comprise the secondary fourth spectral power $SP(P_2, \Lambda_4)$. In embodiments $SP(P_1, \Lambda_4)>0$ Watt. In embodiments $SP(P_2, \Lambda_4)/SP(P_2, \Lambda_1)<SP(P_1, \Lambda_4)/SP(P_1, \Lambda_1)$, especially wherein $SP(P_2, \Lambda_4)/SP(P_2, \Lambda_1)<0.25*SP(P_1, \Lambda_4)/SP(P_1, \Lambda_1)$. In embodiments $SP(P_2, \Lambda_4)/SP(P_2, \Lambda_2)<SP(P_1, \Lambda_4)/SP(P_1, \Lambda_2)$, especially wherein $SP(P_2, \Lambda_4)/SP(P_2, \Lambda_2) \leq 0.5*SP(P_1, \Lambda_4)/SP(P_1, \Lambda_2)$. In embodiments $SP(P_2, \Lambda_{34})/SP(P_2, \Lambda_1) \leq 0.05*SP(P_1, \Lambda_{34})/SP(P_1, \Lambda_1)$.

Alternatively or additionally, the controllable spectral power distribution may in embodiments comprise a fifth spectral range $\Lambda_5$. Especially, the fifth spectral range $\Lambda_5$ may have one or more wavelengths in the wavelength range of 360-400 nm. In embodiments, the fifth spectral range $\Lambda_5$ may have a primary fifth spectral power $SP(P_1, \Lambda_5)$ during the first time period $P_1$ and a secondary fifth spectral power $SP(P_2, \Lambda_5)$ during the second time period $P_2$.

In embodiments, the first spectral range $\Lambda_1$, the second spectral range $\Lambda_2$, the amber-red spectral range $\Lambda_{34}$, the optional fourth spectral range $\Lambda_4$, and the fifth spectral range $\Lambda_5$ may essentially be non-overlapping. Especially, the first spectral power distribution $E_1$ may further comprise the primary fifth spectral power $SP(P_1, \Lambda_5)$ and the second spectral power distribution $E_2$ may further comprise the secondary fifth spectral power $SP(P_2, \Lambda_5)$. In embodiments $SP(P_1, \Lambda_5)>0$ Watt, $SP(P_2, \Lambda_5)>0$ Watt. In embodiments $0.8 \leq SP(P_2, \Lambda_5)/SP(P_2, \Lambda_1)/SP(P_1, \Lambda_5)/SP(P_1, \Lambda_1) \leq 1.25$.

Figure 2E:
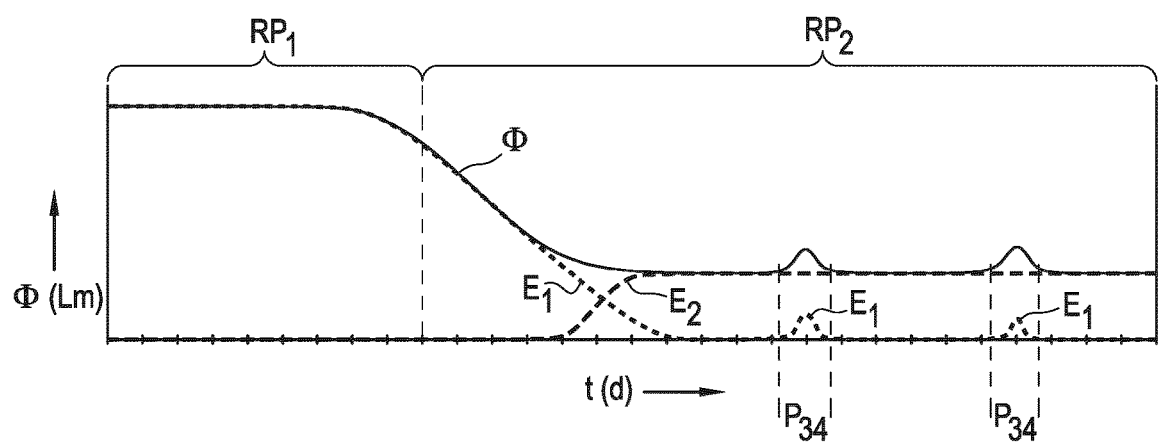

Referring to FIG. 2e (and also FIGS. 1a-1b), the sensor 310 and control system 300 may especially be configured to monitor poultry behavior. The control system 300 may in embodiments be configured to provide during the second rearing period $RP_2$ one or more pulses of system light 1001 having the first spectral power distribution $E_1$ with a first pulse duration $P_3$. In specific embodiments, the pulse duration $P_3$ may be selected from the range of at maximum 4 hours.

In embodiments, approximately equal (+/−20%) intensities of blue, green, and red spectra may be provided during the brooding phase of poultry rearing and approximately two times (+/−20%) as much blue as green and substantially no red during the grow-out phase may be provided, see also FIGS. 2a-2e.

In embodiments, a fourth spectral component (amber) may or may not be included during the brood phase, which may in specific embodiments be a phosphor-based light source with a peak between green and red. Would an amber spectrum be included, the relative intensity of this peak may also be approximately equal (+/−20%) to the other peaks during the "brood" phase. In specific embodiments, the amber light source light may be removed essentially completely during the grow-out phase, similar to the red channel.

In specific embodiments, the blue spectrum may be defined as a light source with a spectral density output function resulting in a peak maximum between 400 nm and 470 nm. The green spectrum may in specific embodiments be defined as a light source with a spectral density output function resulting in a peak maximum between 510 nm and 580 nm. The red spectrum may in specific embodiments be defined as a light source with a spectral density output function resulting in a peak maximum between 580 nm and 750 nm. The amber spectrum is defined here as a light source with a spectral density output function resulting in a peak maximum between 580 nm and 620 nm.

Based on a plurality of measurements wherein the effect of spectral power distributions on poultry, especially chickens was tested, desirable spectral power distributions were defined (see above, and see e.g. FIG. 2a).

The optimized lighting spectral ratios may be independent of light source. It can be achieved by mixing of multiple light sources or through filtering of a multispectral light source. The relative peak intensities can be measured according to peak height or integrated area under the peak, especially based on the latter (with an energy-based y-scale).

In embodiments, a specific solution to build this invention would be to design a circuit with three different LED channels. Channel 1 may contain only blue LEDS (e.g. 450 nm peak wavelength). Channel 2 may contain only green LEDs (e.g. 530 nm peak wavelength). Channel 3 may contain only red LEDs (e.g. 660 nm peak wavelength). Light output from each channel may be controllable individually via a dimming mechanism, such as pulsed-width modulation, current limitation, or phase-cut. In embodiments, during the brood phase, all three channels would be driven equally to allow equal light emission from all channels. During grow-out, channel 3 may in embodiments be shut off and channel 2 may in embodiments be dimmed to half the intensity of channel 1; see also FIG. 3b.

In embodiments, the system may also be designed with as little as two channels (see also FIG. 3b). In embodiments, channel 1 may contain blue LEDs (450 nm peak wavelength) and green LEDs (530 nm) and channel 2 may contain green LEDs (530 nm peak wavelength) and red LEDs (660 nm peak wavelength). Light output from each channel may be controllable individually via a dimming mechanism, such as pulsed-width modulation, current limitation or phase-cut. During the brood phase, both channels may in embodiments be driven essentially equally to allow equal light emission from both channels. In embodiments, during grow-out, channel 2 may substantially be shut off, leaving essentially channel 1 to emit blue and half the green intensity spectrum.

In embodiments, a scheduler may be used to define the output of each channel according to the time of day and according to day of production. The scheduler may be used by the control system to control the system light.

Amongst others, the system and or method may be used for rearing of broiler chickens. For instance, in embodiments of this invention the system may be used for rearing of broiler (meat) chickens. Commercial breeds of broiler chickens may remain as pre-reproductive juveniles over their about <8-week lifespan. The timeframes for brooding and grow-out described above may apply only to commercial breeds of broiler chickens. Other breeds and species may have other defined timeframes.

Alternatively or additionally, the system and or method may be use for rearing of juvenile breeding stock and layer stock. Hence, in addition (or alternative) to raising chickens as a source of meat, chickens may also be raised for their reproductive capacity. Juvenile female chickens (pullets) may be raised to lay table eggs or fertile eggs as adults, and males (cockerels) may be raised to be used as breeding stock as adults. In these cases, their juvenile stage persists much longer than a broiler chicken-typically up to about 16-20 weeks. Here, "brooding" lighting spectrum may be used for the first about 1-2 weeks, and the "grow-out" lighting spectrum may be used thereafter.

Further, in embodiments pulsed lighting may be applied: for instance, pre-defined pulses of "brood" lighting condition may be used during grow-out period (see also FIG. 2e). This may improve activity and feeding in older birds. Pulses of light may be either more intense lighting conditions or differing spectral composition or a combination of both intensity and spectral composition. When pulse intensity is being modulated, inter pulse intervals may comprise low-level lighting (e.g. 0.1-20 lux); pulses may include higher intensities of light (>20 lux). Especially, in embodiments the pulse may be at least 1.5 times more bright than the baseline intensity.

When pulse spectral composition may be modulated, inter pulse intervals may comprise a grow-out spectral composition as described in relation to FIG. 2e. Pulses would increase the red and green channels to match those of "brood", also described in FIG. 2e. Pulse lengths and inter pulse intervals may be held constant throughout the light period, or may be varied throughout the day. An example pulse schedule would be one hour pulse and 3 hours inter pulse interval. The pulse duration could range from 5 minutes to 2 hours; the inter pulse interval could range from 10 minutes to 6 hours.

Further, in embodiments the invention allows adaptive lighting based on feedback. For instance, sensors may be used to detect condition of individuals or flock. Further, in embodiments the "brood" condition may be used longer if needed, or the "grow-out" condition could be started earlier if needed. In embodiments, the "brood" condition may be used transiently to increase bird activity even during the grow-out period. The "grow-out" condition may be used for periods of time during the brooding period if the birds require rest or respite.

The invention may be applied for chicken (including chicks). Other species/breeds may be turkeys, ducks, geese, pheasants, quails, guinea fowls. The term "chicken" may also refer to slow-growing broiler chickens or heritage breed chickens.

In embodiments, one or more additional lighting channels can be added.

For instance, in embodiments amber may be added. The amber spectrum may in embodiments be defined as a light source with a spectral density output function resulting in a peak maximum between 580 nm and 620 nm. If an amber spectrum is included, the relative intensity of this peak may in embodiments also be approximately equal (+/−20%) to the other peaks during the brood phase. In embodiments, the amber light source light may essentially be removed completely during the grow-out phase, similar to the red channel.

Adding in amber may increase color rendering index allowing the poultry to distinguish a larger gamut of colors. Since amber has about both red and green components, it may be treated most like red in the recipe definition. Amber may be present in embodiments in about equal intensity to the other channels during brood, but it may desirably be dimmed substantially during grow-out. In other embodiments, amber may be used to replace the red channel completely.

For instance, in (other) embodiments, UV and/or deep-blue light, such as e.g. UV-A, may be provided. Ultraviolet-A light may have biological effects similar to blue on poultry: It seems to have a calming effect and to lower stress. Control of the UV-A channel may essentially be similar to blue. Herein, the UV-A spectrum may be defined as a light source with a spectral density output function resulting in a peak maximum between 360 nm and 400 nm. Would an UV-A be included, the relative intensity of this peak may also be approximately equal (+/−20%) to the other peaks during the brood phase. In embodiments, the UV-A light source may be retained essentially completely during the grow-out phase, essentially similar to the blue channel.

With respect to a transition between "brood" and "grow-out" conditions, in embodiments the transition between "brood" and "grow-out" conditions may occur between about days 10-20 (after hatching). Each of the peak intensities may in embodiments be about linearly interpolated across the 10 days so there are no abrupt lighting spectrum changes from day to day. In alternative embodiments, a transition could take place up to 40 days or as little as after 1-2 days.

A number of trials was executed, see below.

Brooding Trial

A trial was conducted to compare the growth rates and feed conversion ratios (FCRs) of broiler chicks brooded under traditional white light versus the lighting regiment outlined in this disclosure. Five rooms of 50 chicks were assigned to one lighting treatment group, 5 rooms of 50 chicks were assigned to the other lighting treatment group. The chicks were managed according to standard broiler management practices, and chick weights and feed consumed were measured. Feed conversion ratios (FCRs) were determined by calculating the amount of feed consumed per chicken divided by the weight of each chicken. Results for 22-day old chicks are shown below:

|  | White Light | Light treatment 2 (this invention) | Improvement |
|---|---|---|---|
| Avg. chick weight | 0.9912 kg | 1.0088 kg | 0.0176 kg (1.8%) |
| Avg. FCR | 1.671 | 1.630 | 4.1 percentage points |

Combined Brood+Grow-Out Trial

A trial was conducted to compare the growth rates and feed conversion ratios (FCRs) of broilers brooded and grown under two different lighting conditions. In Lighting Treatment #1, red light dimmed away completely as the lights were dimmed. In Lighting Treatment #2, red light also dimmed away, but the green light was also dimmed to half the intensity during the dimming process. Lighting Treatment #2 represents the invention outlined in this disclosure. traditional white light versus the lighting regiment outlined in this disclosure. Five rooms of 50 chicks were assigned to one lighting treatment group, 5 rooms of 50 chicks were assigned to the other lighting treatment group. The birds were managed according to standard broiler management practices, and bird weights and feed consumed were measured. Feed conversion ratios (FCRs) were determined by calculating the amount of feed consumed per chicken divided by the weight of each chicken. Results for birds at the end of the trial are shown below:

|  | Light Treatment 1 | Light Treatment 2 (this invention) | Improvement |
|---|---|---|---|
| Avg. bird weight, day 42 | 2.8164 kg | 2.8470 kg | 0.0306 kg (1.1%) |
| Avg. FCR | 1.763 | 1.756 | 0.7 percentage points |

Further Trials

A broiler farm was used to test the performance of birds given traditional white light versus the lighting regimen outlined in this disclosure. Identical barns with matched flock-sourced chicks were used between comparison groups. About 11,000 birds were placed per barn, and were managed according to standard broiler management practices. Feed conversion ratios (FCRs) were determined by calculating the amount of feed consumed per chicken divided by the weight of each chicken. Results of three rounds of testing are shown below:

|  | FCR White Light | FCR, this invention | FCR improvement |
|---|---|---|---|
| Trial 1 | 1.63 | 1.57 | 6 percentage points |
| Trial 2 | 1.782 | 1.652 | 13 percentage points |
| Trial 3 | 1.783 | 1.724 | 5.9 percentage points |

In yet a further trial, isolation tests, emergence tests, and tonic immobility tests were executed in dependence of the light recipe. Further, the heterophil-lymphocyte ratios were tested in dependence of the light recipe. A control group received light of which the blue-green ratio was not changed over and a test group received light according to the herein described schedule. All tests showed that the test group had better results than the control group.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system, wherein the light generating system is configured to generate system light having a controllable spectral power distribution and intensity, wherein the light generating system is configured to generate during a first time period $P_1$, a first spectral power distribution $E_1$, and during a second time period $P_2$, later in time than the first period $P_1$, a second spectral power distribution $E_2$, wherein:
  the controllable spectral power distribution comprises (a) a first spectral range $\Lambda_1$ having one or more wavelengths in the blue, and having a primary first spectral power $SP(P_1, \Lambda_1)$ during the first time period $P_1$ and a secondary first spectral power $SP(P_2, \Lambda_1)$ during the second time period $P_2$, (b) a second spectral range $\Lambda_2$ having one or more wavelengths in the green, and having a primary second spectral power $SP(P_1, \Lambda_2)$ during the first time period $P_1$ and a secondary second spectral power $SP(P_2, \Lambda_2)$ during the second time period $P_2$, and (c) an amber-red spectral range $\Lambda_{34}$ having one or more wavelengths in the amber-red, and having a primary amber-red spectral power $SP(P_1, \Lambda_{34})$ during the first time period $P_1$ and a secondary amber-red spectral power $SP(P_2, \Lambda_{34})$ during the second time period $P_2$;
  the first spectral power distribution $E_1$ comprises the primary first spectral power $SP(P_1, \Lambda_1)$, the primary second spectral power $SP(P_1, \Lambda_2)$, and the primary amber-red spectral power $SP(P_1, \Lambda_{34})$; the second spectral power distribution $E_2$ comprises the secondary first spectral power $SP(P_2, \Lambda_1)$, the secondary second spectral power $SP(P_2, \Lambda_2)$, and the secondary amber-red spectral power $SP(P_2, \Lambda_{34})$;
  the first period $P_1$ is selected from the range of at least part of a day; the second period $P_2$ is selected from the range of at least part of a day;
  $SP(P_1, \Lambda_1) > 0$ Watt, $SP(P_1, \Lambda_2) > 0$ Watt, and $SP(P_1, \Lambda_{34}) > 0$ Watt;
  $SP(P_2, \Lambda_1) > 0$ Watt, and $SP(P_2, \Lambda_2) > 0$ Watt;
  $SP(P_2, \Lambda_2)/SP(P_2, \Lambda_1) < SP(P_1, \Lambda_2)/SP(P_1, \Lambda_1)$;
  $SP(P_2, \Lambda_{34})/SP(P_2, \Lambda_1) < SP(P_1, \Lambda_{34})/SP(P_1, \Lambda_1)$;
  $SP(P_2, \Lambda_{34})/SP(P_2, \Lambda_2) < SP(P_1, \Lambda_{34})/SP(P_1, \Lambda_2)$,
  the light generating system is further configured to provide during a first rearing period $RP_1$ selected from the range of 5-20 days, each day during the first time period $P_1$ system light with the first spectral power distribution $E_1$, and subsequently during a second rearing period $RP_2$ selected from the range of at least 10 days, each day during the second time period $P_2$ system light with the second spectral power distribution $E_2$;
  the light generating system comprising one or more light generating devices configured to generate the system light; and
  the light generating system comprising a control system, configured to control the controllable spectral power distribution and intensity of the system light.

2. The light generating system according to claim 1, wherein the first spectral range $\Lambda_1$ has one or more wavelengths selected from the wavelength range of 400-470 nm, the second spectral range $\Lambda_2$ has one or more wavelengths selected from the wavelength range of 510-580 nm, the amber-red spectral range $\Lambda_{34}$ has one or more wavelengths selected from the wavelength range of 580-750 nm, and wherein:
  the first period $P_1$ is selected from the range of 8-24 hours; the second period $P_2$ is selected from the range of 8-22 hours;
  $SP(P_2, \Lambda_2)/SP(P_2, \Lambda_1) \leq 0.75 * SP(P_1, \Lambda_2)/SP(P_1, \Lambda_1)$;
  $SP(P_2, \Lambda_{34})/SP(P_2, \Lambda_1) \leq 0.25 * SP(P_1, \Lambda_{34})/SP(P_1, \Lambda_1)$; and
  $SP(P_2, \Lambda_{34})/SP(P_2, \Lambda_2) \leq 0.5 * SP(P_1, \Lambda_{34})/SP(P_1, \Lambda_2)$.

3. The light generating system according to claim 1, wherein the controllable spectral power distribution in the amber-red spectral range $\Lambda_{34}$ comprises a third spectral range $\Lambda_3$ having one or more wavelengths in the red with one or more wavelengths selected from a wavelength range of 620-750 nm and a fourth spectral range $\Lambda_4$ having one or more wavelengths in the amber wavelength range with one or more wavelengths selected from the range of 580-620 nm, wherein:
  the third spectral range $\Lambda_3$ has a primary third spectral power $SP(P_1, \Lambda_3)$ during the first time period $P_1$ and a secondary third spectral power $SP(P_2, \Lambda_3)$ during the second time period $P_2$;
  the fourth spectral range $\Lambda_4$ has a primary fourth spectral power $SP(P_1, \Lambda_4)$ during the first time period $P_1$ and a secondary fourth spectral power $SP(P_2, \Lambda_4)$ during the second time period $P_2$;
  the first spectral power distribution $E_1$ comprises the primary third spectral power $SP(P_1, \Lambda_3)$ and the primary fourth spectral power $SP(P_1, \Lambda_4)$; and the second spectral power distribution $E_2$ further comprises the secondary third spectral power $SP(P_2, \Lambda_3)$ and the secondary fourth spectral power $SP(P_2, \Lambda_4)$;
  $SP(P_1, \Lambda_3) > 0$ Watt and $SP(P_1, \Lambda_4) > 0$ Watt;
  $SP(P_2, \Lambda_3)/SP(P_2, \Lambda_1) \leq 0.25 * SP(P_1, \Lambda_3)/SP(P_1, \Lambda_1)$ and $SP(P_2, \Lambda_4)/SP(P_2, \Lambda_1) \leq 0.25 * SP(P_1, \Lambda_4)/SP(P_1, \Lambda_1)$; and
  $SP(P_2, \Lambda_3)/SP(P_2, \Lambda_2) \leq 0.5 * SP(P_1, \Lambda_3)/SP(P_1, \Lambda_2)$ and $SP(P_2, \Lambda_4)/SP(P_2, \Lambda_2) \leq 0.5 * SP(P_1, \Lambda_4)/SP(P_1, \Lambda_2)$.

4. The light generating system according to claim 3, wherein:
  the controllable spectral power distribution comprises (a) the first spectral range $\Lambda_1$ having one or more wavelengths in the blue, and having the primary first spectral power $SP(P_1, \Lambda_1)$ during the first time period $P_1$ and the secondary first spectral power $SP(P_2, \Lambda_1)$ during the second time period $P_2$, (b) the second spectral range $\Lambda_2$ having one or more wavelengths in the green, and having the primary second spectral power $SP(P_1, \Lambda_2)$ during the first time period $P_1$ and the secondary second spectral power $SP(P_2, \Lambda_2)$ during the second time period $P_2$, and (c) a third spectral range $\Lambda_3$ having one or more wavelengths in the red, and having the primary third spectral power $SP(P_1, \Lambda_3)$ during the first time period $P_1$ and the secondary third spectral power $SP(P_2, \Lambda_3)$ during the second time period $P_2$;
  the first spectral range $\Lambda_1$, the second spectral range $\Lambda_2$, and the third spectral range $\Lambda_3$ are non-overlapping;
  the first spectral power distribution $E_1$ comprises the primary first spectral power $SP(P_1, \Lambda_1)$, the primary second spectral power $SP(P_1, \Lambda_2)$, and the primary third spectral power $SP(P_1, \Lambda_3)$; the second spectral power distribution $E_2$ comprises the secondary first spectral power $SP(P_2, \Lambda_1)$, the secondary second spectral power $SP(P_2, \Lambda_2)$, and the secondary third spectral power $SP(P_2, \Lambda_3)$;
  the first period $P_1$ is selected from of at least part of a day; the second period $P_2$ is selected from the range of at least part of a day;
  $SP(P_1, \Lambda_1) > 0$ Watt, $SP(P_1, \Lambda_2) > 0$ Watt, and $SP(P_1, \Lambda_3) > 0$ Watt;
  $SP(P_2, \Lambda_1) > 0$ Watt, and $SP(P_2, \Lambda_2) > 0$ Watt;
  $SP(P_2, \Lambda_2)/SP(P_2, \Lambda_1) < SP(P_1, \Lambda_2)/SP(P_1, \Lambda_1)$;
  $SP(P_2, \Lambda_3)/SP(P_2, \Lambda_1) < SP(P_1, \Lambda_3)/SP(P_1, \Lambda_1)$; and
  $SP(P_2, \Lambda_3)/SP(P_2, \Lambda_2) < SP(P_1, \Lambda_3)/SP(P_1, \Lambda_2)$.

5. The light generating system according to claim 1, wherein $SP(P_2, \Lambda_{34})/SP(P_2, \Lambda_1) \leq 0.05 \cdot SP(P_1, \Lambda_{34})/SP(P_1, \Lambda_1)$.

6. The light generating system according to claim 1, wherein the controllable spectral power distribution comprises a fifth spectral range $\Lambda_5$ having one or more wavelengths in the wavelength range of 360-400 nm, and having a primary fifth spectral power $SP(P_1, \Lambda_5)$ during the first time period $P_1$ and a secondary fifth spectral power $SP(P_2, \Lambda_5)$ during the second time period $P_2$, wherein:
 the first spectral power distribution $E_1$ further comprises the primary fifth spectral power $SP(P_1, \Lambda_5)$; and the second spectral power distribution $E_2$ further comprises the secondary fifth spectral power $SP(P_2, \Lambda_5)$;
 $SP(P_1, \Lambda_5) > 0$ Watt, $SP(P_2, \Lambda_5) > 0$ Watt; and
 $0.8 \leq (SP(P_2, \Lambda_5)/SP(P_2, \Lambda_1))/(SP(P_1, \Lambda_5)/SP(P_1, \Lambda_1)) \leq 1.25$.

7. The light generating system according to claim 1, wherein the first spectral power distribution $E_1$ provided during the first rearing period $RP_1$ gradually changes to the second spectral power distribution $E_2$ provided during the second rearing period $RP_2$ wherein the resulting spectral power distribution comprises the first spectral power distribution and the second spectral power distribution with changing relative contributions over a period of time of 1-5 days.

8. The light generating system according to claim 1, wherein the first rearing period $RP_1$ selected from the range of 5-14 days, and wherein the second rearing period $RP_2$ selected from the range of at least 40-60 days.

9. The light generating system according to claim 1, wherein the first rearing period $RP_1$ selected from the range of 5-14 days, and wherein the second rearing period $RP_2$ selected from the range of at least 70-140 days.

10. The light generating system according to claim 1, wherein the lighting system is configured to (i) provide the system light with the first spectral power distribution $E_1$ during the first rearing period $RP_1$ with a first luminous flux $Im_1$, and (ii) provide the system light with the second spectral power distribution $E_2$ during the second rearing period $RP_2$ with a second luminous flux $Im_2$, wherein in average over the respective rearing periods $Im_2 < Im_1$.

11. The light generating system according to claim 1, further comprising a sensor, wherein the control system is configured to control the controllable spectral power distribution and intensity in dependence of a sensor signal of the sensor.

12. The light generating system according to claim 11, wherein the sensor and control system are configured to monitor poultry behavior, and wherein the control system is configured to provide during the second rearing period $RP_2$ one or more pulses of system light having the first spectral power distribution $E_1$ with a first pulse duration $P_{34}$, wherein the pulse duration $P_{34}$ is selected from the range of at maximum 4 hours.

13. An animal farm system comprising a poultry residence and the light generating system according to claim 1 for providing system light in the poultry residence.

14. A poultry light generating device comprising the light generating system according to claim 1,
 wherein the poultry light generating device comprises a first electric circuit, a second electric circuit, one or more first light sources;
 wherein the one or more light generating devices comprise one or more second light sources and one or more amber-red light sources; wherein:
 the one or more first light sources are configured to generate first light source light having the one or more wavelengths in the blue;
 the one or more second light sources are configured to generate second light source light having the one or more wavelengths in the green;
 the one or more amber-red light sources are configured to generate amber-red light source light having the one or more wavelengths in the amber-red;
 the one or more first light sources are functionally coupled to the first electric circuit, the one or more amber-red light sources are functionally coupled to the second electric circuit, and wherein one or more of the following applies: (i) the one or more second light sources are functionally coupled to a third electric circuit, and (ii) one or more of the one or more second light sources are functionally coupled to the first electric circuit and one or more of the one or more second light sources are functionally coupled to the second electric circuit; and
 the control system is configured to control the one or more first light sources, the one or more second light sources, and the one or more amber-red light sources.

15. A method for providing system light in a poultry residence, the method comprising providing the system light with a light generating system;
 wherein the light generating system is configured to generate system light having a controllable spectral power distribution and intensity, wherein the light generating system is configured to generate during a first time period P1, a first spectral power distribution E1, and during a second time period P2, later in time than the first period P1, a second spectral power distribution E2, wherein:
 the controllable spectral power distribution comprises (a) a first spectral range Λ1 having one or more wavelengths in the blue, and having a primary first spectral power SP(P1, Λ1) during the first time period P1 and a secondary first spectral power SP(P2, Λ1) during the second time period P2, (b) a second spectral range Λ2 having one or more wavelengths in the green, and having a primary second spectral power SP(P1, Λ2) during the first time period P1 and a secondary second spectral power SP(P2, Λ2) during the second time period P2, and (c) an amber-red spectral range Λ34 having one or more wavelengths in the amber-red, and having a primary amber-red spectral power SP(P1, Λ34) during the first time period P1 and a secondary amber-red spectral power SP(P2, Λ34) during the second time period P2;
 the first spectral power distribution E1 comprises the primary first spectral power SP(P1, Λ1), the primary second spectral power SP(P1, Λ2), and the primary amber-red spectral power SP(P1, Λ34); the second spectral power distribution E2 comprises the secondary first spectral power SP(P2, Λ1), the secondary second spectral power SP(P2, Λ2), and the secondary amber-red spectral power SP(P2, Λ34);
 the first period P1 is selected from the range of at least part of a day; the second period P2 is selected from the range of at least part of a day;
 SP(P1, Λ1)>0 Watt, SP(P1, Λ2)>0 Watt, and SP(P1, Λ34)>0 Watt;
 SP(P2, Λ1)>0 Watt, and SP(P2, Λ2)>0 Watt;
 SP(P2, Λ2)/SP(P2, Λ1)<SP(P1, Λ2)/SP(P1, Λ1);
 SP(P2, Λ34)/SP(P2, Λ1)<SP(P1, Λ34)/SP(P1, Λ1);
 SP(P2, Λ34)/SP(P2, Λ2)<SP(P1, Λ34)/SP(P1, Λ2), the light generating system is further configured to provide during a first rearing period RP1 selected from the range of 5-20 days, each day during the first time period P1 system light with the first spectral power distribution E1, and subsequently during a second rearing period RP2 selected from the range of at least 10 days, each day during the second time period P2 system light with the second spectral power distribution E2;

the light generating system comprising one or more light generating device configured to generate the system light; and the light generating system comprising a control system, configured to control the controllable spectral power distribution and intensity of the system light.

* * * * *